United States Patent
Larsen

(10) Patent No.: US 7,123,016 B2
(45) Date of Patent: Oct. 17, 2006

(54) SYSTEMS AND METHODS USEFUL FOR DETECTING PRESENCE AND / OR LOCATION OF VARIOUS MATERIALS

(75) Inventor: James Wagner Larsen, Suwanee, GA (US)

(73) Assignee: Admiralty Corporation, Atlanta, GA (US)

( * ) Notice: Subject to any disclaimer, the term of this patent is extended or adjusted under 35 U.S.C. 154(b) by 0 days.

(21) Appl. No.: 10/827,089

(22) Filed: Apr. 19, 2004

(65) Prior Publication Data

US 2004/0196045 A1 Oct. 7, 2004

Related U.S. Application Data

(62) Division of application No. 09/852,255, filed on May 9, 2001, now Pat. No. 6,724,191.

(60) Provisional application No. 60/203,025, filed on May 9, 2000.

(51) Int. Cl.
*G01V 3/08* (2006.01)
*G01N 27/72* (2006.01)

(52) U.S. Cl. .................... 324/326; 324/232

(58) Field of Classification Search ............ 324/326, 324/329, 233, 232, 335, 337; 342/22, 83, 342/102
See application file for complete search history.

(56) References Cited

U.S. PATENT DOCUMENTS

| | | | |
|---|---|---|---|
| 3,686,564 A | 8/1972 | Mallick, Jr. et al. | |
| 3,826,973 A * | 7/1974 | Pflaum | 324/329 |
| 4,017,858 A | 4/1977 | Kuipers | |
| 4,072,942 A * | 2/1978 | Alongi | 342/22 |
| 4,486,713 A | 12/1984 | Gifford | |
| 4,507,612 A * | 3/1985 | Payne | 324/329 |
| 4,628,265 A * | 12/1986 | Johnson et al. | 324/329 |
| 4,706,031 A * | 11/1987 | Michiguchi et al. | 324/337 |
| 4,795,995 A | 1/1989 | Eccleston et al. | |
| 4,868,504 A * | 9/1989 | Johnson | 324/329 |
| 4,942,360 A * | 7/1990 | Candy | 324/329 |
| 5,119,028 A | 6/1992 | Mooney et al. | |
| 5,334,981 A * | 8/1994 | Smith et al. | 342/27 |
| 5,557,206 A | 9/1996 | Won | |
| 5,576,627 A * | 11/1996 | McEwan | 324/639 |
| 5,642,050 A | 6/1997 | Shoemaker | |
| 5,654,938 A | 8/1997 | Tang | |
| 5,680,048 A | 10/1997 | Wollny | |
| 5,781,436 A | 7/1998 | Forgang et al. | |
| 5,786,696 A | 7/1998 | Weaver et al. | |
| 5,955,884 A | 9/1999 | Payton et al. | |

(Continued)

OTHER PUBLICATIONS

Czipott et al., Use of Superconductive Gradiometer in an Ultrasensitive Electromagnetic Metal Detector, Mar. 1989, IEEE Transactions on Magnetics, vol. 25, No. 2, pp. 1204-1207.*

(Continued)

*Primary Examiner*—Bryan Bui
*Assistant Examiner*—Toan M. Le
(74) *Attorney, Agent, or Firm*—Kilpatrick Stockton LLP

(57) ABSTRACT

The present invention provides systems and methods which can be employed to locate or detect presence of various materials, including nonferrous metals. These systems include new and useful sensors, circuits, systems and devices which power and/or interoperate with the sensors, and methods of making, operating and using such systems. Any or all of the systems, devices or processes can be combined with other systems, devices or processes disclosed.

4 Claims, 32 Drawing Sheets

SYSTEM BLOCK DIAGRAM

U.S. PATENT DOCUMENTS

| | | | |
|---|---|---|---|
| 5,963,035 A | 10/1999 | Won | |
| 6,204,667 B1 * | 3/2001 | Won | 324/329 |
| 6,211,807 B1 * | 4/2001 | Wilkison | 342/22 |
| 6,362,737 B1 * | 3/2002 | Rodgers et al. | 340/572.1 |
| 6,534,985 B1 * | 3/2003 | Holladay et al. | 324/334 |
| 6,541,966 B1 * | 4/2003 | Keene | 324/243 |
| 6,724,191 B1 * | 4/2004 | Larsen | 324/329 |
| 6,822,570 B1 | 11/2004 | Dimmer et al. | |
| 2004/0017197 A1 | 1/2004 | Chen et al. | |

OTHER PUBLICATIONS

Bakhvalov et al., Usage of Millimeter Waves in On-Board Radar for Detection of Objects on Small Depth in Ground, IEEE 2000, pp. 432-434.*

Chaturvedi et al., Electromagnetic Imaging of Underground Targets Using Constrained Optimization, 1995, IEEE Transactions on GeoScience and Remote Sensing, vol. 33, No. 3, pp. 551-561.*

* cited by examiner

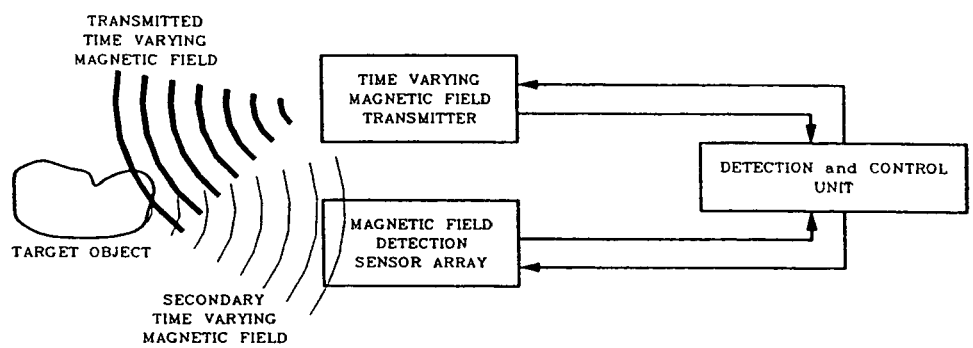
FIGURE 1-1 SYSTEM BLOCK DIAGRAM

TRANSMITTER WITH KNOWN OUTPUT FUNCTION

TRANSMITTER WITH MAGNETIC FIELD MONITOR

RESIDUAL MAGNETIC FIELD NULLING
USING A NULLING MAGNETIC FIELD

VOLTAGE NULLING OF RESIDUAL FIELD SENSOR OUTPUT

TRANSMITTER COIL CROSS SECTION FOR SINGLE WIRE COIL
SHOWING SENSOR POSITION AND RESIDUAL FIELD

TRANSMITTER COIL CROSS SECTION FOR NORMAL RECTANGULAR COIL
SHOWING SENSOR POSITION AND RESIDUAL FIELD

TRANSMITTER COIL CROSS SECTION FOR SHAPED COIL
SHOWING SENSOR POSITION AND RESIDUAL FIELD

GRADIENT SENSING USING A MATCHED SENSOR PAIR

SENSOR PAIR CALIBRATION
USING TWO TRANSMITTER EQUAL COILS

SENSOR PAIR CALIBRATION
USING A LARGE SOLENOID COIL

SYSTEM WITH MULTIPLE SENSOR PAIRS
AND SYNCHRONOUS DETECTION
BASED ON DSP PROCESSORS

AN 8 SECTION (+ − + + − + − −)
TIME ENCODED WAVEFORM

SYNCHRONOUS PULSE WIDTH MODULATION AMPLIFIER

TYPICAL PULSE WIDTH MODULATION WAVEFORMS

STANDARD TANK CIRCUIT

AT RESONANCE TOTAL CURRENT IS ZERO
BECAUSE, $I_L = -I_c$

TANK CIRCUIT WITH SERIES CAPACITOR
AND INDUCTOR TO LIMIT OFF RESONANCE $I_c$

TANK CIRCUIT WITH TWO RESONANCES

TANK CIRCUIT WITH
SINGLE FREQUENCY BLOCKING CIRCUIT

TANK CIRCUIT WITH
A MULTIPLE FREQUENCY BLOCKING CIRCUIT
FOR N DISCRETE FREQUENCIES

WHEN SWITCH IS CLOSED CIRCUIT OSCILLATES
AT RESONANT FREQUENCY, $w_R$

AN H-BRIDGE SWITCH NETWORK
CONNECTINT THE CHARGED CAPACITOR
TO THE LOAD COIL

SWITCHED CAPACITOR CIRCUIT WAVEFORMS

PULSE WIDTH MODULATED
SWITCHED CAPACITOR RESONATOR

SWITCHED CAPACITOR RESONATOR
WITH INTEGRAL SWITCHING POWER SUPPLY

SENSE COIL EQUIVALENT CIRCUIT

OPERATIONAL AMPLIFIER BASED
VOLTAGE TO CURRENT CONVERSION CIRCUIT

A 4 SEGMENT (+ − − +)
TIME ENCODED WAVEFORM

NOTE: THE INTEGRAL OF THIS WAVEFORM WITH A CONTINUOUS SINE WAVE IS ZERO

CORRELATION OF THE 4 SEGMENT (+ − − +)
ENCODED WAVEFORM WITH ITSELF

NOTE: THE INTEGRAL OF THIS WAVEFORM WITH A CONTINUOUS SINE WAVE IS 0.0526

CORRELATION OF THE 19 SEGMENT
(++++--++-++----+-+-)
ENCODED WAVEFORM WITH ITSELF

NOTE: THE INTEGRAL OF THIS WAVEFORM WITH A CONTINUOUS SINE WAVE IS −0.1

CORRELATION OF THE 20 SEGMENT
(+−−−++−−+−−+−++−+−+−)
ENCODED WAVEFORM WITH ITSELF

NOTE: THE INTEGRAL OF THIS WAVEFORM WITH A CONTINUOUS SINE WAVE IS ZERO

CORRELATION OF THE 22 SEGMENT
(++++-----+--+-+++--++-)
ENCODED WAVEFORM WITH ITSELF

LOCAL MAGNETIC FIELD GENERATION
FOR RESIDUAL FIELD CANCELLATION

SYSTEMS AND METHODS USEFUL FOR DETECTING PRESENCE AND / OR LOCATION OF VARIOUS MATERIALS

CROSS-REFERENCE TO RELATED APPLICATION

This application is a divisional of U.S. Ser. No. 09/852,255 entitled "Systems and Methods Useful for Detecting Presence and/or Location of Various Materials" filed on May 9, 2001, now U.S. Pat. No. 6,724,191, which claims the benefit of U.S. Provisional Application No. 60/203,025 filed on May 9, 2000, the contents of which are incorporated herein by reference.

SUMMARY OF THE INVENTION

The present invention provides systems and methods which can be employed to locate or detect presence of various materials, including nonferrous metals. These systems include new and useful sensors, circuits, systems and devices which power and/or interoperate with the sensors, and methods of making, operating and using such systems. Any or all of the systems, devices or processes can be combined with other systems, devices or processes disclosed.

1. Devices For Detecting and Identifying Conductive or Magnetic Objects Introduction Devices according to the present invention are capable of performing sophisticated target location, classification, and recognition of conductive or magnetic objects independently without the use of other devices or systems and can be deployed by themselves in an area survey. This is accomplished by the simultaneous and accurate phase and magnitude measurement of the response of a target object to time varying magnetic fields of several frequencies.

While several types of magnetic/electromagnetic methods have been employed by others, the ability to accurately measure phase and amplitude as a function of frequency has been lacking. This measurement is necessary for the classification of materials. Much of the most sophisticated magnetic target location research to date has been conducted by the United States Navy for the purpose of location and detection of mines and unexploded ordnance. This work has been carried out primarily by the Coastal Systems Station (CSS) of the Navy's Naval Surface Warfare Center. They have developed some of the most sophisticated passive magnetic field sensing instruments. These include both total field and vector magnetometers as well as gradient magnetometers. However, their work does not include active time varying magnetic field generation.

BACKGROUND

Classical electromagnetic theory provides the underlying relationships for the description of operation of devices according to the present invention. An electrical current produces a magnetic field throughout space. The magnetic induction at any point in space, dB, due to a current flowing in an infinitely small (differential) length element is proportional to the magnitude of the current, I, times the vector cross product of the length element, dl, and the distance vector from the element to the point in space, x, divided by the cube of the magnitude of the distance vector:

$$dB = k_C I(dl Gx)/|x|^3. \quad (1)$$

where $k_C$ is the proportionality constant. In Gaussian units $k_C=1/c$, where c is the speed of light. In MKSA units $k_C=1/(4\pi\epsilon_0)^{1/2}$. Therefore, the total magnetic induction at any point in space can be calculated by integrating over the total current path for all currents of concern.

$$B = \int k_C I(dl Gx)/|x|^3. \quad (2)$$

Furthermore, if the current is varying with time, then both I and dB become functions of time, I(t) and dB(t), and the relation becomes:

$$B(t) = \int k_C I(t)(dl Gx)/|x|^3. \quad (3)$$

In free space the magnetic field, H, is proportional to the magnetic induction, B. The proportionality constant, $\mu_0$, is the permeability of free space and its value depends on the choice of the system of units. Thus:

$$H(t) = \mu_0 B(t). \quad (4)$$

The second relationship states that a time varying magnetic induction will produce an electric field, E, over any closed path as follows:

$$g E(t) \cdot dl = -k_E (d/dt) \int\!\!\int B(t) \cdot n \, da. \quad (5)$$

Equation 5 states that the line integral of E over the closed path whose elements are dl is proportional, $k_E$, to the negative of the time derivative of the surface integral, over any continuous surface bounded by the closed path, of the vector dot product of the magnetic induction and the unit surface normal, n, to the surface enclosed by the path. da is a surface element of that surface.

Any material has an associated conductivity, $\sigma_M$, and magnetic permeability, $\mu_M$. Both the conductivity and permeability are material specific as signified by the subscript, M. These properties react with the local electric and magnetic fields, E and H. This interaction produces both currents and magnetic fields within the material. The magnetic induction in a material produced by the magnetic field is given by:

$$B(t) = \mu_M \mu_0 H(t), \quad (6)$$

where $\mu_0$ is the permeability of free space and $\mu_M$ is the material's relative permeability. There are three major classes of magnetic materials. They are differentiated by the size of $\mu_M$. The ferromagnetic materials have large, positive permeabilities. These materials include iron, nickel, cobalt and most of their alloys. The paramagnetic materials, which include most other metals, have permeabilities that are greater than one by only parts per million; their permeabilities are small when compared to those of ferromagnetic materials. The third class of magnetic materials is the diamagnetic materials. These materials have permeabilities that are slightly less than one by amounts equivalent in size to that of the paramagnetic materials. A few of the metals are diamagnetic. Ferromagnetic materials are referred to as ferrous materials and paramagnetic and diamagnetic materials are referred to as nonferrous materials.

The current by produced the imposed electric field, commonly called an eddy current, is proportional to the product of the impedance, $Z_M$, which includes the conductivity and the shape functions, and the magnitude of the electric field, E; thus:

$$I(t) = k_1 E(t)/Z_M, \quad (7)$$

where $k_1$ is the proportionality constant. The impedance is in general a complex number and is a function of the shape of the material along with its conductivity. As with magnetic materials there are three major classes of materials based on their conductivities. The conductors, which include metals, have relatively large conductivities. The insulators have conductivities that are a million to a trillion times smaller. In between lie the semiconductors. Materials can also be classified by their permittivities. In general the permittivities are relatively unimportant at the frequencies of interest for the conductors; therefore the effects due to the displacement currents are extremely small and can be neglected in the following arguments. Furthermore the displacement current will add a small $-jZ_C$ term which will be overwhelmed by the much larger inductive term in the case of conductors. The aspect ratios of the targets are generally close to one. In this case for the materials of interest the impedance is strongly inductive and can be described by the relation:

$$Z_M = Z_R + jZ_L, \tag{8}$$

where, $Z_R$ is the real impedance, which is a function of the conductivity and the shape, and $Z_L$ is the imaginary part of the impedance, which is a function of the shape.

The materials of interest have high permeabilities, high conductivities, or both. Equations 6 and 7 show that these materials will produce a secondary magnetic field either directly from the applied magnetic field due to $\mu_M$ or indirectly through an induced current due to $\sigma_M$. It is these secondary magnetic fields that are sensed in all types of magnetic/electromagnetic sensing systems. Equation 5 shows that an electric field is only produced if the magnetic field is time varying; therefore, nonferrous materials cannot be detected by a constant magnetic field. The passive magnetic field sensing methods used by the Navy and all others for large area surveys are thus only capable of sensing the ferrous materials. In these methods the residual magnetic field from the earth, approximately 0.00005 T (Tesla) provides the local magnetic field at the target material. A ferrous target then creates a secondary field that can be sensed as a variation in the constant background field of the earth. This field is generally dipole in nature and falls off as the cube of the distance from the target. The field falls off very rapidly as the distance to the target increases. The field due to appropriate sized objects can be thousands or millions of times smaller that the background field of the earth. In addition the earth's field varies with time. These variations although spatially uniform can be greater that the signal from the target material. In order to remove these variations gradient techniques are used. The difference in the signal originating from two sensors physically separated will not contain the any part of the uniform background, even if it is varying with time, if the sensors are perfectly matched. Only that portion of the signal originating from "local" objects will be detected, due to their change as a function of position. The field from far away objects is much more uniform and will not be detected. In this manner the gradient technique is much more sensitive than the full field or vector magnetometers used in surveys.

There are drawbacks to using this gradient based system, however. The gradient decreases much more rapidly with distance than does the field. It decreases as the distance to the fourth power. The other concern is that matching of the sensors. It is this matching that governs the degree to which the uniform (common mode) portion of the signal can be rejected. Systems can be built that are capable of achieving a factor of a million in common mode rejection. As good as these passive systems are they cannot detect nonferrous materials; however, in most situations ferrous materials are associated with the nonferrous targets of interest and their detection can be used to map the debris pattern of an area.

In order to detect nonferrous materials, systems according to the present invention generate an alternating current in a transmitter coil. This current is of the form:

$$I(t) = I\omega \sin(\omega t), \tag{9}$$

where $I_T$ is the current magnitude and $\omega$ is the angular frequency $\omega = 2\pi f$, where f is the frequency). Equations 3 and 4 thus state that there is a magnetic field at the target that is proportional to this current. Equation 6 shows that the secondary magnetic induction, $B_f$ produced by the target is proportional to this field; thus:

$$B_f(t) = k_f \sin(\omega t), \tag{10}$$

where $k_f$ is the proportionality constant.

Equation 5 shows that there is an electric field at the target that is proportional to the negative of the time derivative of I(t). The time derivative of I(t) is given by:

$$dI(t)/dt = \omega I_\omega \cos(\omega t); \tag{11}$$

thus the electric field impressed onto the target, $E_T$, is:

$$E_T(t) = -k_E \omega I_\omega \cos \omega t), \tag{12}$$

where $k_E$ is the proportionality constant.

If the material is highly conductive as are most materials of interest then the character of its impedance is mostly imaginary and appears as an inductance of the form:

$$Z_L \approx j\omega L, \tag{13}$$

where L is the effective inductance of the sample. This imaginary impedance adds an effective time integration to the electric field to produce the induced current. Thus the induced current, $I_T$, at the target is:

$$I_T(t) = -k_r \sin(\omega t), \tag{14}$$

where $k_r$ is a constant of proportionality. Equation 3 gives the secondary magnetic induction as proportional to the current. Thus the secondary induction due to the conductivity of the target, $B_n$, is:

$$B_n(t) = -k_n \sin(\omega t), \tag{15}$$

where $k_n$ is the proportionality constant. Equations 10 and 15 show that the contributions to the secondary fields at the sensors due to the magnetic and electrical properties of the materials would be opposite in sign. It is therefore possible for an active AC system of this type to differentiate between ferrous materials which are dominated by the $B_r$ term and the nonferrous materials which are dominated by the $B_n$ term. The total field at the sensors is:

$$B_{tot}(t) = B_f(t) + B_n(t). \tag{16}$$

In the simplified case described above the total field is given by:

$$B_{tot}(t) = (k_f - k_n)\sin(\omega t). \tag{17}$$

Thus the signal varies from positive to negative depending on the relative strengths of the magnetic and electrical properties of the materials.

The active DC magnetic field sensing methods create a time varying magnetic field by moving a magnet across the field to be surveyed. This creates a time varying magnetic field at a given any given point in the field. In this manner the active DC magnetic field sensing technique can be used to differentiate between ferrous and nonferrous materials.

The limitation of the moving magnet type of system is that if there is a mixture of ferrous and non ferrous material, the one with the stronger secondary field will dominate. Only that material will be detected, but at a weaker signal strength than if it were present alone. It would be possible to mask the nonferrous signal with ferrous material. The active system overcomes this limitation. A more detailed analysis of the material impedance shows a complex character that can be used to better differentiate between materials. Equation 8 shows the material impedance as composed of a real part, $Z_R$, and an imaginary part, $Z_L$. The above approximation assumed that because the conductivity of the material was large that the real part of the impedance was near zero and could be neglected. This is true only to a first order approximation. In a real material the real part of the impedance is a factor. Not only does the material exhibit a real impedance but its magnitude is dependent on the permeability, conductivity and frequency. The real part of the impedance is proportional to the conductivity. In addition for an AC magnetic field the penetration into an object is limited by an attenuation factor. To first order approximation there is a surface layer in which all conduction can be considered to take place. This layer restricts the current flow. Its thickness is referred to as the skin depth, δ, which has the form:

$$\delta = [2/\omega\mu_0\mu_M\sigma)]^{1/2}. \qquad (18)$$

The real part of the impedance can be expressed as:

$$Z_R = k_R/\{\sigma[2/\omega\mu_0\mu_M\sigma)]^{1/2}\}, \qquad (19)$$

which reduces to:

$$Z_R = k_R(\omega\mu_0\mu_M)^{1/2}/(2\sigma)^{1/2}. \qquad (20)$$

The impedance has p phase, $\phi_z$, that is given by:

$$\phi_z = \tan^{-1}(Z_L/Z_R). \qquad (21)$$

Thus Equation 14 becomes:

$$I_T(t) = -k_I \sin \omega(t+\phi_z), \qquad (22)$$

and by substitution into Equation 16, the magnetic field, due to the material, as seen at the sensor is given by:

$$B_{tot}(t) = k_f \sin(\omega t) - k_n \sin(\omega t + \phi_z). \qquad (23)$$

The phase of the sensor signal at the target due to the secondary field generated by the target material has a phase which is no longer merely positive or negative. A measure of this phase is material specific. This phase is a function of the material conductivity and permeability and of the applied magnetic field frequency. A measure of the relative phase between the applied magnetic field and the secondary field generated by the target as a function of frequency gives a material specific signature which can be used to differentiate one material from another. In order for a system to make use of this feature it must be capable of accurately measuring the relative phases. The active DC magnetic field techniques, as practiced by others, of passing a magnetic field over a target, cannot accomplish this since there is no phase reference for the applied field.

The active AC magnetic field generated by this system is capable of precise phase measurement. Since the active system generates a precise AC magnetic field and has the waveform available for comparison, it can use synchronous detection to precisely determine the phase and amplitude at any frequency and to reject noise both out of band and in band uncorrelated noise. The system in fact can generate multiple frequencies simultaneously and can synchronously detect the secondary fields generated by the target materials simultaneously at each frequency. The use of multiple frequencies all of which are exactly correlated achieves an extremely low dynamic noise level. These multiple frequencies are also preferably digitally time encoded to further eliminate background noise. This time encoding involves periodically in time changing the phase of the transmitted frequencies. The encoding can be designed so that the temporal correlation of a non correlated signal will be very close to zero; whereas the correlation of the transmitted signal with the target signal will remain unchanged and large.

This system can suffer background and noise limitations similar to those of the passive magnetic field techniques. For that reason the preferred active system employs multiple matched sensor sets, positioned symmetrically to the transmitter field, to simultaneously measure in multiple directions both the magnetic field components and its gradients. The use of gradients greatly increases the system's immunity to background noise from distant objects and from slowly varying backgrounds. In this way the far field electromagnetic noise from the earth is eliminated along with the broad conductivities of mineralization. In addition the relative structure of the field gradients can be used to determine distance and direction of the target from the sensor system, not only providing desired target information but also providing a means of eliminating any signals from the tow vehicle.

The precision of the background field elimination in the active system is different from that of the passive systems. In the passive systems the background field of the earth must be eliminated from the sensor signals. In the active system the field due to the transmitter coil must be eliminated from the sensor signals as well. While the earth's background signal is approximately 0.00005 T the field due to the source can be as high as a few Tesla or ten thousand times greater than the earth's field. Because the output of the transmitter is known, synchronous system techniques can be used along with the shape of the magnetic field transmitter to eliminate this field from the sensors.

BRIEF DESCRIPTION OF THE DRAWINGS

FIG. 1-1 is a block diagram of systems according to an embodiment of the invention.

FIG. 1-2 is a functional block diagram of certain transmitter with known output function according to an embodiment of the invention.

FIG. 1-3 is a functional block diagram of a certain transmitter with magnetic field monitor according to an embodiment of the invention.

FIG. 1-4A is functional block diagram of residual magnetic field nulling using a nulling magnetic field in accordance with an embodiment of the invention.

FIG. 1-4B is a functional block diagram of voltage nulling of residual field sensor output according to an embodiment of the invention.

FIG. 1-5A is a schematic view of a transmitter coil cross section for single wire coil showing sensor position and residual field according to an embodiment of the invention.

FIG. 1-5B is a schematic view of a transmitter coil cross section for normal rectangular coil showing sensor position and residual field according to an embodiment of the invention.

FIG. 1-5C is a schematic view of a transmitter coil cross section for shaped coil showing sensor position and residual field according to an embodiment of the invention.

FIG. 1-6 is a functional block diagram showing a certain gradient sensing using a matched sensor pair according to an embodiment of the invention.

FIG. 1-7 is a schematic view of sensor pair calibration using two transmitter equal coils according to an embodiment of the invention.

FIG. 1-8 is a schematic view of sensor pair calibration using a large solenoid coil according to an embodiment of the invention.

FIG. 1-9 is a functional block diagram of a system with multiple sensor pairs and synchronous detection based on DSP processors according to an embodiment of the invention.

FIG. 1-10 is a schematic view of a time encoded waveform according to an embodiment of the invention.

FIG. 2-1 is a functional block diagram of a synchronous pulse width modulation amplifier according to an embodiment of the invention.

FIG. 2-2 is a schematic view of certain typical pulse width modulation waveforms according to an embodiment of the invention.

FIG. 3-1 is a schematic diagram of a tank circuit of the sort which can be used in embodiments of the invention.

FIG. 3-2 is a schematic diagram of a tank circuit according to an embodiment of the invention.

FIG. 3-3 is a schematic diagram of a tank circuit with series capacitor and inductor according to an embodiment of the invention.

FIG. 3-4 is a schematic diagram of a tank circuit with two resonances according to an embodiment of the invention.

FIG. 3-5 is a schematic diagram of a tank circuit with single frequency blocking circuit according to an embodiment of the invention.

FIG. 3-6 is schematic diagram of a tank circuit with a multiple frequency blocking circuit for N discrete frequencies according to an embodiment of the invention.

FIG. 4-1 is a schematic diagram of certain oscillators according to embodiments of the invention.

FIG. 4-2 is a schematic diagram of a switch network for connecting charge capacitors to load coils according to embodiments of the invention.

FIG. 4-3 is a schematic view of certain switched capacitor circuit waveforms according to embodiments of the invention.

FIG. 4-4 is a schematic diagram of pulse width modulated switched capacitor resonators according to an embodiment of the invention.

FIG. 4-5 is a schematic diagram of certain switched capacitor resonator with integral switching power supplies according to embodiments of-the-invention.

FIG. 5-1 is a schematic diagram of a sense coil equivalent circuit according to an embodiment of the invention.

FIG. 5-2 is a schematic diagram of an operational amplifier based voltage to current conversion circuit according to an embodiment of the invention.

FIG. 5-3 is a sensitivity diagram according to certain embodiments of the invention.

FIG. 6-1 is a diagram showing a time encoded waveform according to certain embodiments of the invention.

FIG. 6-2 is a diagram of a 4 segment encoded waveform according to certain embodiments of the invention.

FIG. 6-3 is a diagram of a 19 segment encoded waveform according to certain embodiments of the invention.

FIG. 6-4 is a diagram of a 20 segment encoded waveform according to certain embodiments of the invention.

FIG. 6-5 is a diagram of a 22 segment encoded waveform in accordance with certain embodiments of the invention.

FIG. 7-1 is a functional block diagram of local magnetic field generation for residual field cancellation according to certain embodiments of the invention.

DESCRIPTION

Figures 1, 2:
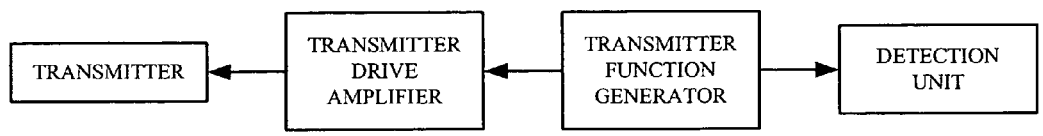

FIG. 1-1. shows the basic components of one system according to the present invention. The system consists of a transmitter that produces a time varying magnetic field, one or more magnetic field detection sensors, and a detection unit for analyzing the data and controlling the unit.

The phases and magnitudes of the frequency components of the transmitted magnetic field should be known relative to some known point in time. These can be known because the method of their production is controlled or because the transmitted magnetic field is monitored by some method. One method by which the transmitted magnetic field can be precisely known is to produce it under very controlled conditions. In the preferred embodiment this is accomplished using a digitally synthesized signal that is used to drive a precision linear amplifier. The amplifier then drives a transmitter coil. It is important that the transmitter be linear so as not to introduce harmonic distortion into the transmitted signal and to maintain the transmitted signal purity. A voltage drive signal for the transmitter coil could be used; however, a current drive signal is preferred. This is due to the fact that the magnetic field is proportional to the current flowing in the coil and not to the voltage applied across it. When a voltage is applied to a coil the current through it and hence the magnetic field is a function of the voltage and the effective inductance of the coil. The inductance of the coil is in turn a function of its internal construction as well as its external environment. This means that the current through the coil as well as the magnetic field it produces as a function of the applied voltage varies with the external environment and is not fixed. When a current drive is used the output field is much more insensitive to the external environment; therefore, the current drive produces a better known output magnetic field.

Regardless of the method by which the magnetic field is created, the transfer function of the source drive amplifier should be accurately measured. In addition the spatial distribution of the transmitted field must be measured and/or calculated. FIG. 1-2 shows the components of a transmitter with a known transfer function.

Figures 1, 2, 3:
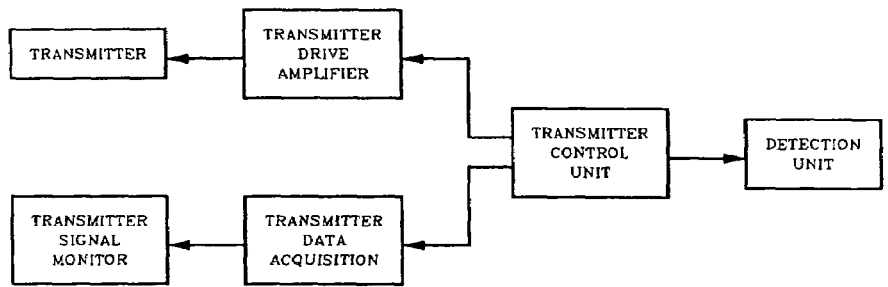

Another method of knowing the magnitude of the output magnetic field is to measure it in real time as the system is in operation. The magnetic field could be monitored by a magnetic field sensor, such as a coil, Hall effect device, or a magnetometer. The output of this field monitor would be available to the signal detection unit (FIG. 1-3.).

The preferred embodiment of this device uses all of these methods. It drives the transmitting coil with a linear current source. The current source is controlled by a precisely generated digital signal. This drive system is tuned to produce a very accurate representation of the desired signal with out feedback from the actual signal that is produced. In addition a magnetic field monitoring device is used to monitor the magnetic field output. The signal from the sensor is then fed back to the system and used to make fine adjustments to the output magnetic field to accommodate errors in the system.

The time varying magnetic field could be produced by alternate methods using permanent magnets and/or dc coils (electromagnets). In one method several magnets would be spatially oriented so as to produce a time varying field when the device is moved over a target. An array of magnets could be used in this manner to create an arbitrary time varying magnetic field. If the velocity of the array of magnets over the target was known then the magnetic field versus time could be calculated and used to calculate the phase information from the field created by the target. In another implementation a single magnet or an array of magnets could be rotated about an axis at a constant or time varying angular velocity to create the time varying field at the target. If the relative movement of the magnet array with respect to the target object is known then the temporal properties of the magnetic field seen by the object could be calculated and used to obtain phase and magnitude information from the object signal. In another implementation a single magnet or an array of magnets could be vibrated or moved in a non constant motion with respect to the target to produce a time varying magnetic field of known properties. These methods have the advantage over the transmitter coil in that the energy used to produce the magnetic field is smaller; however, it is generally more difficult to obtain accurate phase information using these methods. In addition the mechanical control of these types of systems can be very complex.

In any of the transmitter implementations, whether ac or dc magnetics are used, the time varying magnetic field produced by the transmitter causes a secondary magnetic field to be produced by a conductive or magnetic target object in its presence. It is this stimulated field that the field detection sensor measures.

Because of physical size limitations, the magnetic field sensors are close to the transmitter. The field due to the transmitter is many times larger (often a billion or more) than the stimulated signal from the conductive or magnetic object. The magnetic field detection sensor, therefore, should be capable of detecting the stimulated magnetic field from an object in the presence of the large signal from the transmitter without clipping or saturating the detector. There are several methods both active and passive by which this can be accomplished. The preferred method is passive. The sensor is placed in a location relative to the transmitter so that the field quantity in the direction sensed by the sensor is as near zero as possible. Typical active methods are nulling methods. The residual magnetic field at the sensor due to the transmitter field could be canceled by the use of a nulling transmitter (FIG. 1-4A.), a voltage null circuit (FIG. 1-4B.) used with the sensor amplifier, or subtracting the known or measured residual in the detection unit.

These active nulling techniques generally only work over a limited field magnitude range; therefore they are generally used only to null the residual field after the sensor has been placed in a location relative to the transmitter that it senses only a small field.

The effectiveness of this residual field nulling often times sets the sensitivity of the device. The stability of the null is often the noise limit of the system. If the residual field sensed by the field sensors is high then slight movements of the sensors can cause large signal noise. This is often the case since near to the transmitter there are large spatial field gradients. This factor makes the shape of the transmitter highly important.

The preferred embodiment of this device has the transmitter coil so shaped as to create a region of near zero field and near zero field gradient where the sensor may be placed. If the field gradient is near zero in the region of the magnetic field sensors then the residual signal they see is less sensitive to their position. FIGS. 1-5A, 1-5B, and 1-5C show various coil configurations of the transmitter coil. They are in order of decreasing field gradient in the vicinity of the sensor. The coil in FIGS. 1-5C. has been designed so that the field lines are flat in the vicinity of the sensor so that side to side movement of the sensor will have little effect on its residual signal. The preferred embodiment of this system will have the transmitter coil designed to specifically desensitize the sensors to movement with respect to the transmitter coil.

The field shapes and gradients can also be modified by the use of different currents in different windings of the transmitter. This method is also effective in reducing the sensitivity of the sensors to their position relative to the transmitter coil. The use of secondary transmitters which function as field shaping devices could be used to locally null the transmitted field and/or its gradients.

These same transmitter field shaping techniques can also be used to modify the transmitted magnetic field in the vicinity of the target object to improve the system performance. This is done to improve signal strength, to improve target classification, or to improve target spatial location.

The magnetic field sensor used in the system can be a total field sensor, a field vector sensor, or a field gradient sensor. The preferred method for looking for small objects at reasonably short ranges is a field gradient sensor. Gradient sensing reduces the effect on the detected signal of large volumes of conductive or magnetic material such as iron rich mineralization or sea water and of the earth's background field. It also reduces the effects of large objects that are away from the immediate search area but not very far away. Deployment platforms and operators are such objects. The preferred implementation uses matched sensor pairs for sensing the gradient of the stimulated magnetic field produced by a conductive or magnetic object and simultaneously sensing the direct field components. The better the match of the sensor pairs, the better the rejection of the constant portions of the fields due to the transmitter, the earth, and the large far away volumes. The performance of the matched pairs will be limited by their matching errors. For this reason the preferred method includes fine gain adjustment amplifiers in order to adjust the sensitivity of each sensor in the pair as close as possible to that of the other sensor in the pair, FIG. 1-6. The adjustment amplifiers can be if desired controlled by the detection unit.

The fine gain adjustment amplifiers of each pair would be adjusted to give the zero difference in the presence of a strong uniform filed. The common method for this calibration would be to use two transmitter coils placed relatively far from the sensor pair on either side of them (FIG. 1-7). These transmitters could be used to produce a uniform field at the two sensors. The gain adjustment amplifiers could then be adjusted to zero the difference of the two sensors in the pair. Other coil configurations such as a large solenoid (FIG. 1-8) could be used to produce a relatively strong uniform field for use in zeroing the difference in matched sensor pairs.

The detection unit monitors the frequency composition of the transmitted signal and that of the received signal. It can be shown using classical electromagnetic theory and the physical properties of materials that the magnitude and phase at a given frequency of the stimulated secondary magnetic field are determined by the physical properties of the material. The detection unit calculates the phase and magnitude relationship between the transmitted magnetic field and the secondary magnetic field. The preferred embodiment of this device uses synchronous detection to determine the magnitude and phase relationship between the output signal from the transmitter and the received field generated by the target object. The synchronous detection is made possible since the detection unit is also responsible for generating and/or has knowledge of the output signal. The magnitude and phase relationship is found for each transmitted frequency and is compared to stored or calculated relationships for different types of materials to determine the nature of the material of the object. The change in this relationship as the system is passed over or by an object is used to determine the range and size of the object. The preferred embodiment uses multiple sensors and sensor pairs to measure/calculate the field and field gradient vectors and therefore can more precisely locate the object in range and direction than can a single sensor or sensor pair.

The use of both direct field and gradient sensors can be used to enhance the positional location of the object. The ratio of the each gradient to the direct field as well as the ratios of the gradients among themselves are functions only of the range, distance and direction, to the object and not of the amount of material in the object as long as the distance to the object is relatively large compared to the size of the object. That is the object appears as a point object. These relations can be measured and/or calculated for the system and subsequently used to determine the range to the target object.

Analysis such as matched filtering, spatial Fourier analysis, etc. can be used to discern multiple objects with overlapping signals due to the multiple objects being within the systems area of coverage.

The preferred system can generate multiple frequencies simultaneously and can synchronously detect the secondary fields generated by the target materials simultaneously at each frequency. The use of multiple frequencies all of which are preferably exactly correlated achieves an extremely low dynamic noise level. FIG. 1-9 shows one preferred implementation of the system with multiple sensor pairs and synchronous detection based on DSP processors. The multiple DSP processors in conjunction with the control and data analysis computer make up the detection unit. In this system a master coordination DSP passes a digital output signal to the transmitter for output and to the synchronous detection DSPs for detection of the target signals.

These multiple frequencies can be as well digitally time encoded to further eliminate background noise. This time encoding involves periodically in time changing the phase of the transmitted frequencies. The encoding can be designed so that the temporal correlation of a non correlated signal will be very close to zero; whereas, the correlation of the transmitted signal with the target signal will remain unchanged and large. FIG. 1-10 shows a typical time encoding scheme that could be used with this system. It periodically reverses the phase of the signal so that the correlation between the signal and a return is high but a non correlated slowly changing signal of the same frequency is very low.

2. Methods for Eliminating the Frequency and Phase Errors between the Input and Output Signal of a Pulse Width Modulated Amplifier, Synchronous Pulse Width Modulation Amplifier The efficiency of high power amplifiers is one of the limiting factors in their utility. The power losses are converted to heat. This heat must be eliminated or it will cause poor performance and do damage to the amplifier. The elimination of this heat can be costly in both complexity and reliability of the amplifier. Cooling systems are necessary. Both active systems (forced air and water cooled) and passive system add expense to the amplifier system. In order to reduce size and costs of the cooling systems much effort has been spent on increasing the amplifier efficiency.

One of the major advances in this effort was the development of pulse width modulation, PWM. PWM techniques use high frequency switching to approximate the desired output voltage or current. This method adjusts the on and off times of a square wave so that the integral over any period of time longer than a few cycles of the square wave is equal to that of the desired output signal. This high frequency switched waveform is then usually lowpass filtered to eliminate the high frequency components in the output waveform that are due to the switching, thus smoothing the waveform. In this manner a good approximation to the desired output signal can be obtained.

PWM achieves its efficiency from the fact that there is no real power loss in a ideal switch. When the switch is opened there is no current flow, thus no power loss. Also when the switch is closed the resistance is zero, thus the resistive power loss is again zero. In many real PWM devices the switching is performed by solid state switching transistors. These devices have some switching losses, but they are usually small at reasonable switching frequencies; therefore, PWM devices can be very efficient (greater than 98%).

The fidelity of PWM based amplifiers can be in many cases limited by switching inconsistencies. This is caused by the fact that the switching clock and the amplifier input signal are not synchronized. This means that for a repeating output signal the switch points for each cycle occur at different times. This causes each cycle of the output to be different. These differences give rise to time varying signals. In the case where a very stable output is desired, this time varying error can be a major concern. This problem will persist to some extent even if both the PWM clock and the input signal to the amplifier are very stable. Frequency and phase drifts between the two signals will lead to the type of errors described above.

The problems caused by relative phase and frequency drifts can be eliminated in the case where the input signal is digitally derived. This can be done with a common system clock to generate the amplifier input signal and the PWM switching clock signals. This means that the frequencies of the signals are absolutely locked and that the relative phases are fixed. This type of PWM amplifier will be referred to as a Synchronous Pulse Width Modulation, SPWM, amplifier.

FIG. 2-1. shows a typical system diagram for a SPWM amplifier. In this system the digital controller contains the clock which is used to generate all of the signals within the system. It generates both the PWM square wave and the desired amplifier input signal. The square wave is integrated to form a triangle wave. Another option is to generate the triangle wave directly. This second option is better suited for systems where the system clock is many times faster than the triangular wave and PWM frequency. This triangular wave is then compared to the desired waveform. If the desired waveform is greater than the triangular wave voltage then the voltage comparator outputs a signal to turn on the switch and apply voltage to the load. If it is less than the triangular wave voltage then the voltage comparator turns the switch off and power is not applied to the load. In this manner the voltage to the load modified by the switch network so as to apply a signal to the load that is a function of the input drive.

The output drive to the load will appear as in FIG. 2-2. The output drive may be optionally filtered to remove high frequency switching noise and to smooth the output. The amplifier can be used open loop as described. It may also be used in a closed loop manner by including an optional feed back network in the system to provide an error signal to the voltage comparitor. In this method the feedback can be related to any desired quantity, i.e. voltage, current, light output, temperature, etc.

2a. Methods for Stabilizing Synchronous Detection Systems Using SPWM Amplifiers—Single Clock Synchronous System Synchronous detection systems are used very effectively in areas where the signal to noise is low, that is where there is significant noise relative to the signal. These systems can typically measure a signal level that is one hundred thousand times smaller than the total noise level. In general synchronous detection systems have very high phase fidelity. This feature is critical to the elimination of noise. Much effort is expended to make the reference signal stable in both frequency and phase. All signals will have some amount of phase jitter, frequency noise, phase drift, and frequency drift. If the input and system added amplitude noise levels are sufficiently low then these timing errors can be the limiting factors affecting the signal measurement. The lower noise limit is in fact in most synchronous detection systems limited by the phase stability of the source signal that is transmitted and the phase stability of the reference used for the synchronous detection. In a digital system the sampling clock stability adds further to the phase uncertainty by adding imprecision to the analog-to-digital conversion process.

In many synchronous detection systems the signal to be measured is derived from the reference signal itself or the reference signal and the signal to be measured are derived from the same signal. In other systems the signal to be measured is derived from or can be derived from a digitally generated signal. This signal will again need a stable, in both frequency and phase, generating clock. This signal clock will have phase and frequency errors of the same types as the reference signal generating clock. Therefore the clocks will not be correlated and signal measurement errors will exist. These errors can be greatly reduced if the same system clock is used to generate both the signal to be measured and the reference signal.

If the same clock is used to generate both signals then the phases of the two signals will be more closely related and the frequencies will track. This will greatly reduce any errors in the system. In this way the effects of phase instability are reduced by more than an order of magnitude. In addition all of the timing patterns and signals used in the system are integer sub multiples of the system repeat cycle time. The system repeat cycle time is an integer multiple of the system master clock period. All other timing sequences are thus integer multiples of the system master clock period. This type of system is referred to as a single clock synchronous system.

In the case of a system employing a SWPM amplifier the clock used in the SPWM amplifier should be the same as that used in the synchronous detection scheme. This type of system will provide the best possible frequency and phase stability between all signals involved in the measurement process.

3. Methods of Efficiently Generating Multiple Frequency Signals in a Circuit-Multiresonant Tank Circuit Many systems require high power output at multiple frequencies for their best operation. One of the most common ways of achieving high power high efficiency outputs is to use a resonant circuit or resonant tank circuit. This type of circuit consists of a capacitor in parallel with an inductor (FIG. 3-1). The values of these components are adjusted so that the circuit resonates at the desired frequency. These circuits are capable of efficiently producing high power, very pure single frequency outputs. More than one of these circuits could be used to simultaneously produce outputs at multiple frequencies. This method is not applicable in many circumstances such as in particular when the output drive signals must be colocated. One example is the production of an acoustic signal from a single point in space. The use of multiple sources would be prohibited. An alternative would be to use a switch array to time multiplex the signals from multiple tank circuits into the single circuit. This is inappropriate in many cases since the switching noise and timing uncertainties would be intolerable. A modification of this method is to use a switch network to switch in different capacitors into the circuit to change the circuits resonant frequency. This method suffers from the same switching noise and timing instabilities as noted for the previous method. This could be achieved using multiple coils with multiple tank circuits or by time multiplexing frequencies. The time multiplexing of frequencies would be implemented by switching various values of capacitors into and out of the circuit, thus changing its resonant frequency.

This patent describes a multiresonant tank circuit capable of simultaneously resonating at several frequencies. The multiresonant tank circuit in its simplest form includes an inductive load (the inductor $L_T$) and capacitor in series with the usual parallel capacitor of the tank circuit (FIG. 3-3). The impedance of the series inductor and capacitor, $Z_F$, is given by:

$$Z_F = i\omega L_F + 1/(i\omega C_F), \qquad (3\text{-}1)$$

where $L_F$ and $C_F$ are the series inductance and series capacitance respectively. If $L_F$ and $C_F$ are chosen such that at the frequency, $\omega_1$, the resonant frequency of the tank circuit:

$$\omega_1^2 L_F C_F = 1, \qquad (3\text{-}2)$$

then $Z_F$ is zero at $\omega_1$. In that case the addition of these two components does not change the resonant behavior of the circuit; the current gain at $\omega_1$ remains unchanged. As the frequency moves away from $\omega_1$, the impedance, $Z_F$, gets very large; therefore, at frequencies far away from $\omega_R$ the current through the parallel capacitor goes to zero. If this current is small the circuit behaves as if only the inductor were present. Therefore at frequencies away from $\omega_1$, $L_F$ and $C_F$ have no effect on the inductor. It may also be noted that $C_T$ and $C_F$ could be combined into a single capacitor, $C_1$, whose value is equal to the series combined values of $C_T$ and $C_F$. A similar circuit could be developed for driving a capacitive load with $C_F$ and $L_F$ in series with $L_T$.

Another parallel capacitor, $C_{T2}$, could be added tuned with $L_T$ to a frequency away from $\omega_1$ and a second resonance, $\omega_2$ would occur at this frequency. If a series inductor, $L_2$, and a series capacitor, $C_{F2}$, were added then this second parallel capacitor would have little effect on the first resonance. $C_{F2}$ and the second parallel capacitor % could be combined into the capacitor $C_2$. This circuit (FIG. 3-4) would thus have two resonances, one at $\omega_1$ and one at $\omega_2$, where the current gain would be high. This procedure could be performed for several frequencies; thus achieving multiple resonances each with high current gains. These resonances would have to be well separated in frequency to avoid interference. In the more general case, however, other components could be added to establish a low resistance, multi-pole impedance network in parallel with the coil. Whenever the imaginary part of the impedance of the multi-pole impedance network was equal in magnitude but opposite in sign to the imaginary part of the coil impedance at a particular frequency, the current gain would be large. In addition if suitable resistors were added to the multi-pole impedance network then the Q of the resonances could be controlled and the gains of each resonance could be set to some desired value.

Figures 1, 2, 3, 4, 4A:
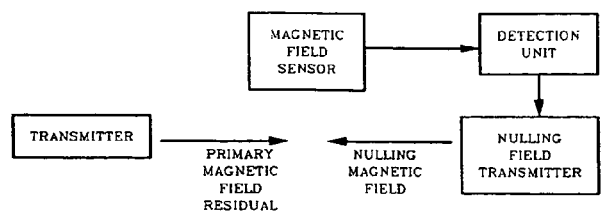
Figures 1, 2, 3, 4, 4B:
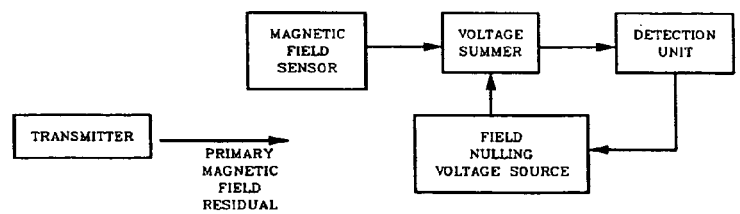
Figures 1, 2, 3, 4, 5, 5A:
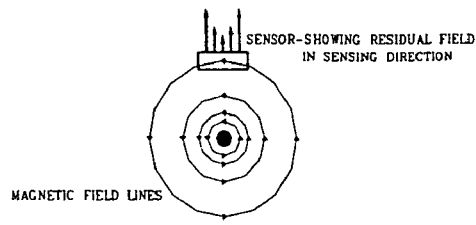
Figures 1, 2, 3, 4, 5, 5B:
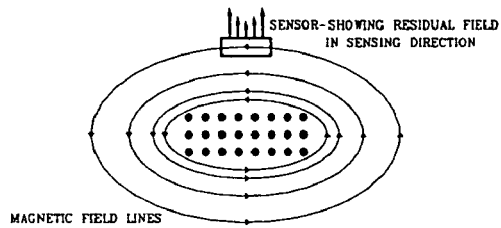
Figures 1, 2, 3, 4, 5, 5C:
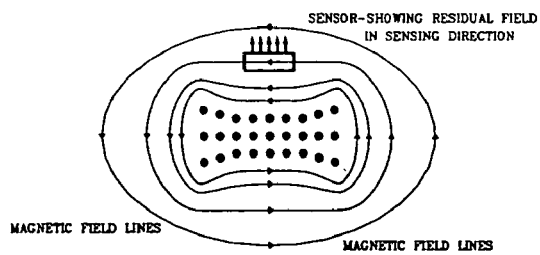

In many cases it is desirable for the total circuit impedance to be high at frequencies other than the desired drive frequencies. In these cases parallel blocking circuits consisting of a capacitor, $C_B$ and an inductor, $L_B$ in series with the tank circuit to block signals at undesirable frequencies. FIG. 3-5 shows the blocking circuit for a single resonance circuit. The blocking circuit is tuned so as only to pass frequency $\omega_1$, The total impedance is given by:

$$Z_{TOT}= \qquad (3\text{-}3)$$

$$\text{with: } \omega_1^2 L_B C_B = 1, \qquad (3\text{-}4)$$

The circuit shows a high impedance at all frequencies. FIG. 3-6 shows a blocking configuration for a multiresonant tank circuit. Each blocking circuit allows only the desired frequency to pass.

Using a suitable multi-pole impedance network the resonant frequencies could be positioned at the desired frequencies as well as setting the Qs for each resonant. The design of this network if not a straight forward task, can be done by a fitting technique. The first guess could be made by choosing the parallel capacitors and the respective series capacitors and inductors as if there were no interactions between the different resonances and then using an optimization program using these as a starting point. The optimization program would then modify the original values looking for a best fit to the desired resonances. A simplex method would be an appropriate tool for this optimization.

4. Methods of Efficiently Generating Multiple Frequency Signals in an Inductive Load-Switched Capacitor Resonator Many systems require high power output at multiple frequencies for their best operation. One of the most common ways of achieving high power high efficiency outputs is to use a resonant circuit or resonant tank circuit. This type of circuit consists of a capacitor in parallel with an inductor (FIG. 4-1). The values of these components are adjusted so that the circuit resonates at the desired frequency. These circuits are capable of efficiently producing high power, very pure single frequency outputs. More than one of these circuits could be used to simultaneously produce outputs at multiple frequencies. This method is not applicable in many circumstances. These include when the output drive signals must be colocated such as for the production of an acoustic signal from a single point in space. The use of multiple sources would be prohibited. An alternative would be to use a switch array to time multiplex the signals from multiple tank circuits into the single circuit. This is inappropriate in many cases as the switching noise and timing uncertainties would be intolerable. A modification of this method is to use a switch network to switch in different capacitors into the circuit to change the circuits resonant frequency. This method suffers from the same switching noise and timing instabilities as noted for the previous method. This could be achieved using multiple coils with multiple tank circuits or by time multiplexing frequencies. The time multiplexing of frequencies would be implemented by switching various values of capacitors into and out of the circuit, thus changing its resonant frequency.

This invention includes a switched capacitor resonator circuit capable of simultaneously resonating at several frequencies. A switched capacitor resonator uses a capacitor as the power source for the resonator as well as the parallel capacitance for the coil. This is a important feature, since the impedances of an ideal capacitor and the ideal coil are both imaginary, no real power is used in the ideal circuit. Therefore, the effeciency can be theroetically very high. In practice, however, there are losses due to losses in real components.

FIG. 4-2 shows the switched capacitor resonator circuit configuration. The capacitor is connected across the coil by a set of switches connected in the configuration of a full wave bridge. Each switch in the set preferably has an optional reverse voltage shunt diode so that if the current through the coil can pass around the switch network if it is flowing in the reverse direction of the capacitor's applied voltage. The switch network applies the capacitors voltage first in one direction across the coil and then in the other direction across the coil. This is done at a very high rate, a rate that is much higher than the highest desired resonant frequency of the coil. This switching frequency should preferably be at least greater by a factor of ten than the highest desired resonant drive frequency. For an ideal coil (a coil with no resistance or parasitic capacitance) the duty cycle of the switch is varied so that the integral of the capacitor applied voltage is equal to the product of the desired change in current through the coil and the coil inductance (i.e. the derivative of the current times the inductance). The coil acts as an integrator smoothing out the steps in the current caused by the switching. This makes the current through the coil appear to be fairly smooth. FIG. 4-3 shows typical signal waveforms in the circuit.

In the real case there is some resistance in both the coil and the capacitor as well as switching losses; therefore, a current monitoring device is used to monitor the current in the load to insure the proper drive levels. This current information is used in feedback to control the switch duration of the switch network. This feedback can be performed in the same way it is done in a switching power supply or a PWM amplifier. In order to insure the greatest possible stability, a synchronous switching clock can be used so that the switch network clock is generated by the same system clock as all other information used within the system. As with the other timing signals the period of this clock is an integer multiple of the system master clock and an integer sub multiple of the system repeat cycle time.

The switched capacitor resonator is theoretically very efficient. The losses in the capacitor and the coil can be held to a minimum by reducing their respective resistances. In the case of the coil the resistance can be reduced by increasing the wire size. For the capacitor a decrease in the effective series resistance of the capacitor will result in a reduction of losses. Today highly efficient switches are available in IGBTs (insulated gate bipolar transistors). The product of the current in the coil and the maximum coil voltage divided by these power losses gives the current gain for this circuit configuration. The losses are made up by the power supplied to the circuit. The power supply which only supplies power to compensate for the losses, must have a supply voltage greater than the maximum voltage applied to the coil. FIG. 4-4 shows a typical switched capacitor resonator.

The switched capacitor provides an added advantage in that it can serve as an integral part of the power supply that replaces the power lost due to the non ideal nature of the components used in the system. The capacitor can itself replace the filter capacitor used in the power supply. This means that if an AC power source is used, only a rectification circuit (typically a diode bridge) is needed to provide power directly to the capacitor circuit. The switched capacitor resonator can, therefore, be directly integrated with its power supply. The coils in this system generally operate at high voltages and moderate currents rather than high currents and moderate voltages. The switched capacitor resonator can be matched to any coil voltage by placing a voltage multiplication transformer between the capacitor and the coil. In this way the switched capacitor resonator can be constructed such as to have an efficient step up or step down switching power supply as part of its implementation. The capacitor and power supply can operate at a moderate voltage while the coil can operate in the high voltage ranges. In addition because of the high switching frequency the transformer can be small, making the circuit implementation very cost effective. These factors make the use of more readily available, more efficient components feasible. FIG. 4-5 shows a typical switched capacitor resonator with its integral switching power supply.

5. Highly Sensitive Broad Band AC Magnetic Field Sensors

Introduction

There are several methods of detecting magnetic fields. These include flux gate magnetometers, ion magnetometers, Hall effect devices, magnetoresistive devices, pickup coils, and SQUIDs. SQUIDs are generally considered to have the greatest sensitivity of the magnetic field sensors, especially in the area of dc magnetic field measurement. For the measurement of ac magnetic fields, coils provide a simple inexpensive sensitive detection device. The open circuit voltage of a single turn coil is proportional to the area integral over the area of the coil of the product of each area element with the magnitude of the magnetic field perpendicular to the coil area at that point. The total voltage is increased by the number of turns in the coil. The total voltage also increases linearly with frequency. This means that as the frequency increases the coil becomes more sensitive. In fact at radio frequencies the coil techniques work very well.

At low frequencies where the sensitivity diminishes because of the low frequency many turns in the coil are necessary to keep the sensitivity at a high level. This poses a problem for real coils which are not ideal inductors. As the number of turns in the coil increases so does the coil's inductance and parallel capacitance (self capacitance). This creates a resonance in the coil response. In order to reduce the thermal noise of the coil, the coil resistance is kept low. This makes the Q of the resonance high. This means that the coil must be used at frequencies below resonance. This factor greatly reduces the range of use and can lead to spurious oscillations.

Sensors according to the present invention preferably use the coil as a current source in conjunction with a current measuring device (circuit) which effectively short circuits the coil. The short circuit current in the coil is proportional to the magnetic field amplitude. This configuration effectively short circuits the coil capacitance and eliminates the resonance. This type of ac magnetic field sensor can, therefore, be used over a very wide frequency band. In addition increasing the number of turns does not reduce the useful band of the device.

BACKGROUND

FIG. 5-1 shows the simplified equivalent circuit for a coil in the presence of an ac magnetic field. The magnetic field induces voltage of magnitude, $V_B$, in the coil. The coil has an inductance, $L_C$, a resistance, $R_C$, and a capacitance, $C_C$.

For simplicity consider a coil of circular cross section in a uniform ac magnetic field parallel to its axis whose amplitude is given by $B\sin(\omega t)$. The coil resistance is given by:

$$R_C = 2\pi r \rho N \quad (5\text{-}1)$$

Where r is the radius of the coil, N is the number of turns in the coil, r is the radius of the coil, and $\rho$ is the wire resistance per unit length. The coil inductance is given by:

$$L_C = \mu_0 N^2 \pi r^2 K/l \quad (5\text{-}2)$$

Where $\mu_0$ is the permeability of free space, l is the coil length, and K is an inductive shape constant. K is generally in the range of 0.1 to 1.0 for real coils. There is no simple formula for the coil capacitance but it generally proportional to $N^x$, where x is between 1 and 2. The magnitude of the voltage induced in the coil is given by:

$$V_B = -N\pi r^2 \omega B \quad (5\text{-}3)$$

The magnitude of the open circuit voltage across the coil, $V_C$, is given by:

$$V_C = V_B/[(1-\omega^2 L_C C_C) + j\omega R_C C_C] \quad (5\text{-}4)$$

As $\omega$ goes to zero $V_C$ goes to $V_B$ which goes to zero. Also as $\omega$ goes to infinity $V_C$ goes to zero. This limits the range of usefulness. In addition when $\omega$ is equal to $(1/L_C C_C)^{1/2}$, then Vc is given by:

$$V_C = -N\pi r^2 \omega B/(j\omega R_C C_C) \quad (5\text{-}5)$$

This represents a resonance. Since the coil resistance and capacitance is small the Q of this resonance is high. The useful range of operation is thus limited to well below the resonance. If the number of turns and or radius of the coil are increased to improve the sensitivity then the resonant frequency is moved lower further reducing the useful frequency band of the sensor.

If the coil is used instead as a current source, the short circuit coil current, Is, is given by:

$$I_S = -N\pi r^2 \omega B/(R_C + j\omega L_C) \quad (5\text{-}6)$$

This is a highpass response with a corner frequency, $\omega_0$, given by, $R_C/L_C$ or:

$$\omega_0 = 2\rho l/(\mu_0 N r K) \quad (5\text{-}7)$$

As the frequency goes to zero the short circuit coil current goes to zero; however above the corner frequency, the current is independent of the frequency and proportional to the magnetic field magnitude. For the frequency above the corner frequency the short circuit coil current is given by:

$$I_S = jBl/(\mu_0 NK) \quad (5\text{-}8)$$

The current mode provides a wide frequency band of operation above the corner frequency. In addition the corner of the band can be made as small as desired by decreasing the wire resistance, $\rho$, or by increasing the coil radius, r. This can be accomplished without changing the sensitivity of the coil's response, $I_S$. It is also important to note that the coil capacitance, which was responsible for the resonance in the voltage mode case, has no affect on the current mode transfer function.

DESCRIPTION

In order for the coil to be used as a magnetic field sensor it is necessary to provide a method of monitoring the coil short circuit current. A current amplifier will serve this purpose. FIG. 5-2 shows a simple operational amplifier current to voltage conversion circuit which is very effective with commercially available components at providing a reasonable voltage signal with low noise. The output voltage of the circuit, $V_S$, is given by:

$$V_S = R_F I_S \quad (5\text{-}9)$$

or:

$$V_S = j R_F B1(\mu_0 N K) \quad (5\text{-}10)$$

In this circuit's operation the voltage across the inputs of the operational amplifier is driven to zero by the feedback; therefore, the coil capacitance has no effect in the circuit.

The sensitivity of the coil as a sensor is determined by the signal to noise ratio of the circuit's output. There are several noise sources in this circuit. The major noise sources are the thermal noise due to the coils resistance, the thermal noise due to the feedback resistor, the input voltage noise of the operational amplifier, and the input current noise of the operational amplifier. The noise voltage due to the coil's resistance over a frequency bandwidth of $B_W$, $V_{RC}$, is given by:

$$V_{RC} = R_F k_n R_C^{1/2} B_W^{1/2} / (j\omega L_C) \quad (5\text{-}11)$$

Where $k_n$ is the thermal noise constant which is a function of the temperature of the resistive material. The noise voltage due to the feedback resistance over a frequency bandwidth of $B_W$, $V_{RF}$, is given by:

$$V_{RF} = k_n R_F^{1/2} B_W^{1/2} \quad (5\text{-}12)$$

The noise voltage due to the operational amplifiers input voltage noise over a frequency bandwidth of $B_W$, $V_{en}$, is given by:

$$V_{en} = (R_F + j\omega L_C) e_n B_W^{1/2} / (j\omega L_C) \quad (5\text{-}13)$$

Where $e_n$ is the operational amplifier input voltage noise. The noise voltage due to the operational amplifiers input current noise over a frequency bandwidth of $B_W$, $V_{in}$, is given by:

$$V_{in} = i_n R_F B_W^{1/2} \quad (5\text{-}14)$$

Where $i_n$ is the operational amplifier input current noise. Since these four noise sources are not correlated, the total noise voltage, $V_N$, is given by:

$$V_N = (V_{RC} + V_{RF} + V_{en} + V_{in})^{1/2} \quad (5\text{-}15)$$

A good measure of the smallest magnetic field that can be measured by the sensor is the magnetic field magnitude, $B_S$, that will produce a signal equivalent to the noise voltage of the system. $B_S$ is given by:

$$B_S = -j\mu_0 N K (V_{RC} + V_{RF} + V_{en} + V_{in})^{1/2} / (R_F 1) \quad (5\text{-}16)$$

The field magnitude $B_S$ can be calculated for various coil and amplifier systems to establish the component coil tradeoffs. FIG. 5-3 shows the value of $B_S$ for a typical system. This system uses a Burr Brown OPA627 operational amplifier with a feedback resister of 10 Mohm. The amplifier is band limited to 2 kHz by using a single capacitor in parallel with the feedback resistor. The coil size is 0.15 m in radius and 0.05 m long. The thickness of the windings is 0.012 m. The whole winding volume is filled with magnet wire of various sizes with a single layer of polyurethane insulation. The sensitivity for #32 wire is better than 120 picoGauss (12 femtoTesla) above 300 Hertz and better than 40 picogauss (4 femtoTesla) above 1 kiloHertz in frequency. This is as good or better than most SQUID magnetic field sensors in this frequency range.

6. Methods of Digital Signal Encoding in Synchronous Detection to Improve Noise Rejection Synchronous detection schemes are very good at eliminating the out of band signals that may interfere with the detection of a weak signal. The effective bandwidth of the signals passed by an ideal synchronous detector is related to the inverse of the integration time as long as it occurs over complete cycle of a sine wave. These methods cannot eliminate in band noise that is equal to the reference frequency in content. In many systems there exist man made backgrounds that are approximately continuous in frequency. These will at times drift in to the desired frequency band and cause erroneous signals that will mask the real signal. In addition natural backgrounds may have the same effect.

Figures 1, 2, 3, 4, 5, 6:
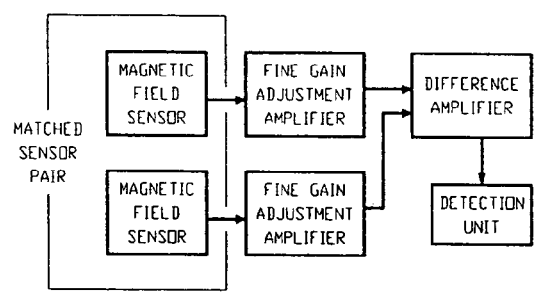

The present invention provides an algorithm which describes a method of digital encoding of the reference signal and the signal to be measured to eliminate in band signal that are not digitally encoded with the same pattern. The process involves periodically changing the phase of the signals of interest. FIG. 6-1 shows a sine wave signal that reverses its phase after N (N=3) complete cycles. The phases of this signal are +, −, −, and +. The synchronous detection reference signal is made up by repeating this pattern. The integration of any product of an acquired signal with this reference will integrate to near zero over each section if it is not close to the reference frequency over that band. If it is equal to the reference frequency and at some arbitrary phase, then the integral over each segment of length N will result in the same magnitude; however the signs of the integral will be opposite over the + phase and − phase of the reference. The sum of the integrals over each section (e.g., the integral over the whole length of the reference waveform.) will be zero, due to the opposite signs on the individual sections. The continuous signal will therefore not affect the measurement of the encoded signal.

This technique reduces the effect of non encoded noises. In addition it can also reduce the effect of time delayed encoded signals. For instance if the acquired signal is delayed in time by the length of one of the segments then the integral over the whole waveform length will be zero; however, if the acquired signal is delayed by the length of two segment periods then the integral will be −1 times the non delayed integral of the same signal. FIG. 6-2 shows the values for the integral over one whole waveform period for delays equal to an integer number of segment periods for the reference pattern shown in FIG. 6-1. FIGS. 6-3, 6-4, and 6-5 show the integral values for more practical encoding patterns of 19, 20, and 22 segments in length. The waveforms in FIGS. 6-3 and 6-4 have non zero but greatly reduced continuous signal integral values of 0.0526 and −0.1 respectively. These patterns have better localization of the delayed encoded pattern integrals than the 4 segment pattern. The waveform in FIG. 6-5 has both a zero continuous integral and well localized delayed encoded pattern integrals.

There are variations of this technique that can be applied. The phases between segments can be stepped in other than + or −180 degree steps, such as: 90 degree or 60 degree steps. The segment lengths need not be the same length. This technique can be applied to multiple frequencies, with each frequency having different encoding patterns and different segment periods to obtain the best elimination of unwanted signals at each particular frequency.

7. Methods of Increasing the Ability of Magnetic Field Sensors to Detect Small Signals in the Presence of Large Background Signals.

The detection of small fields is frequently limited by the saturation of the initial amplifier's stages. In order to detect a small signal the gain of the first amplifier stages must be high enough to bring the signal above the amplifier noise. If the background or system offset signals are large with respect to the small signal to be detected, then amplifier saturation will result. This is a problem in both direct field and gradient systems. If the direct signal saturates before the gradient calculation can be performed then the information is also lost, even if the gradient calculation would have removed the large background or system offset signals.

This problem still exists in the case of the ac magnetic field system with magnetic field sensor placed in a position with respect to the transmitter. The signal seen by the sensor is not always in phase or 180 degrees out of phase with the transmitter signal and therefore cannot be completely zeroed by position adjustments of the sensor. This is due to capacitive coupling between the system and the sensor, capacitive coupling between the sensor and the external environment, material responses within the system, or material responses of the background in the external environment to site a few causes. These items can have major phase components at 90 degrees to the transmitter signal.

Figures 1, 2, 3, 4, 5, 6, 7:
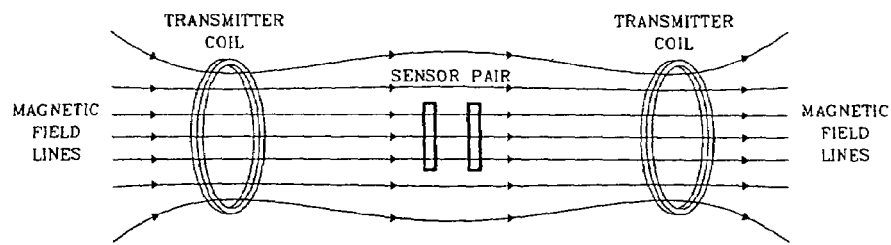
Figures 1, 2, 3, 4, 5, 6, 7, 8:
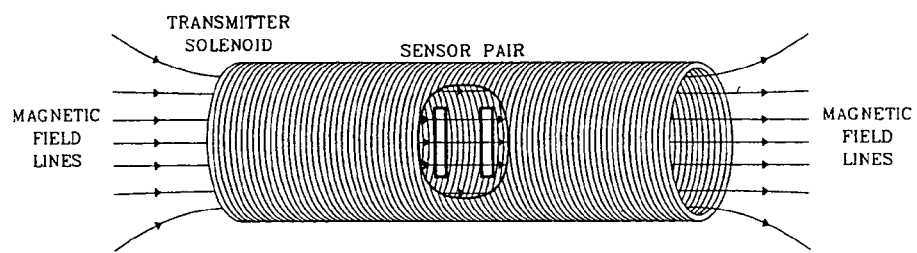
Figures 1, 2, 3, 4, 5, 6, 7, 8, 9:
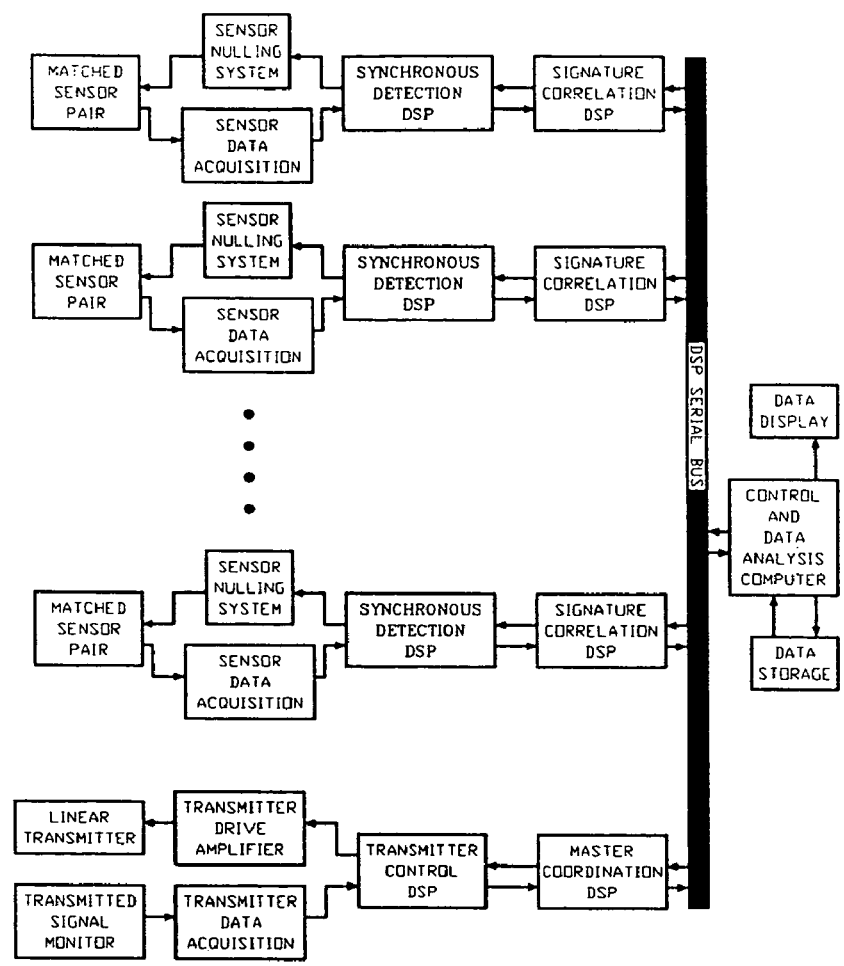
Figures 1, 2, 3, 4, 5, 6, 7, 8, 9, 10:
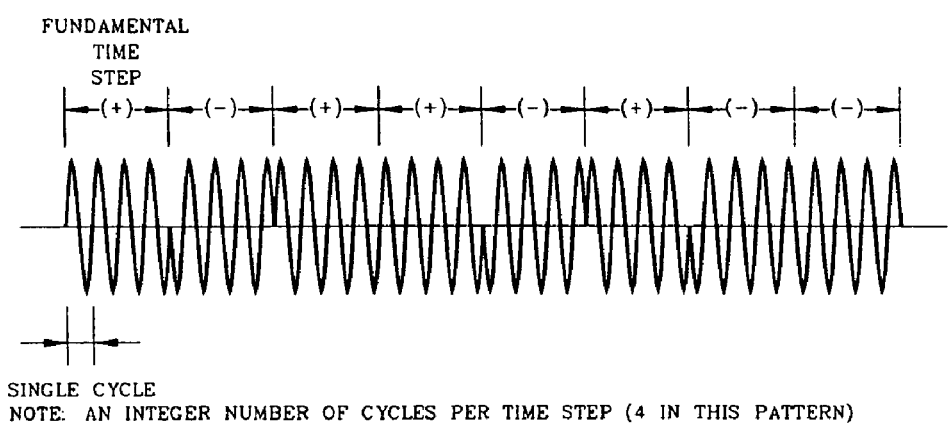
Figures 1, 2:
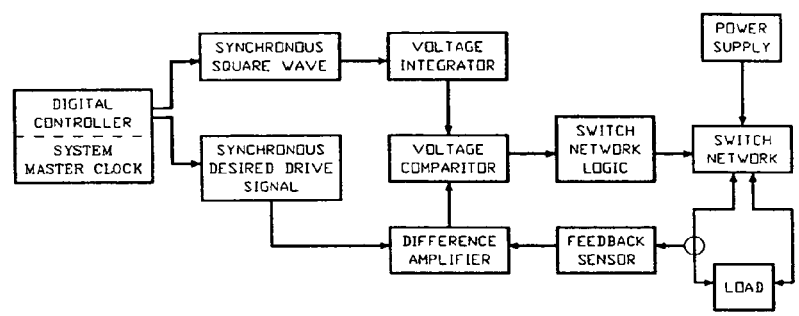
Figure 2:
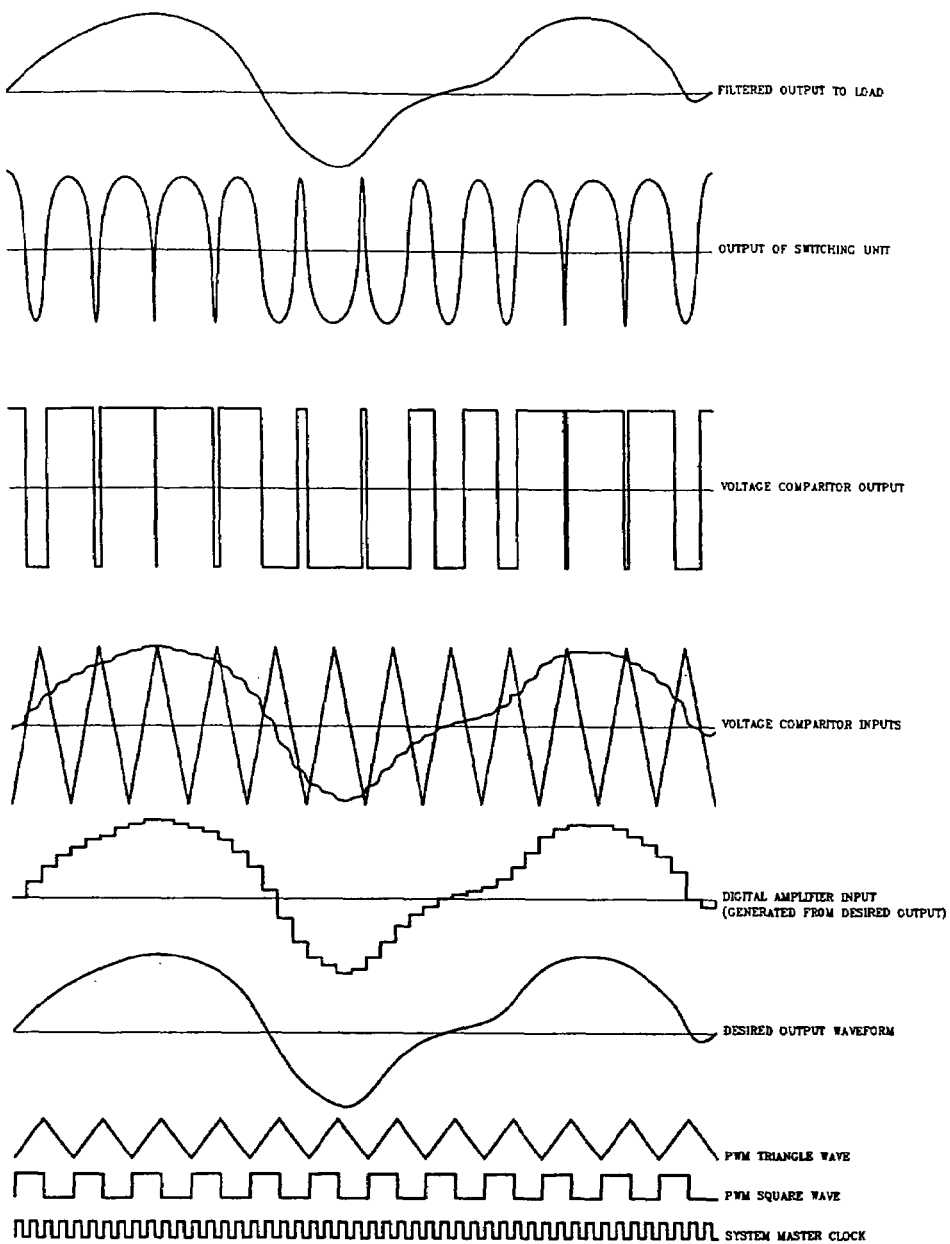
Figures 1, 3:
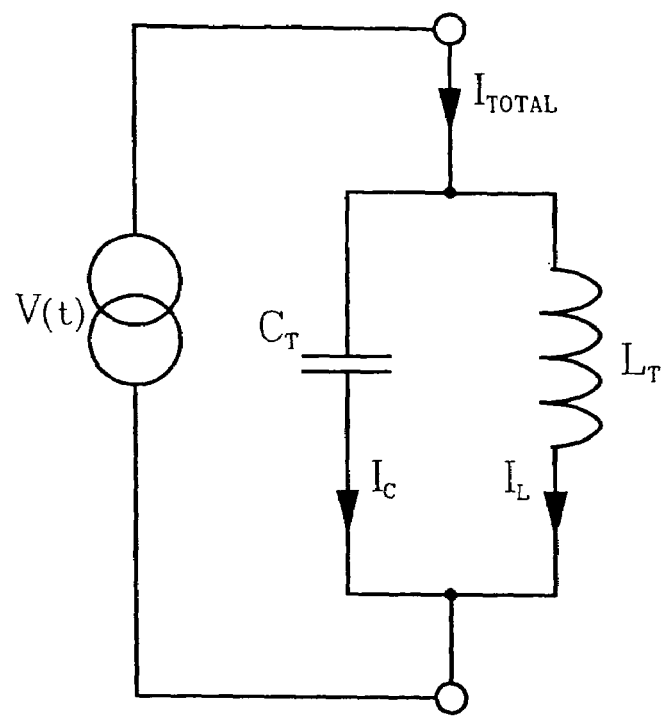
Figures 2, 3:
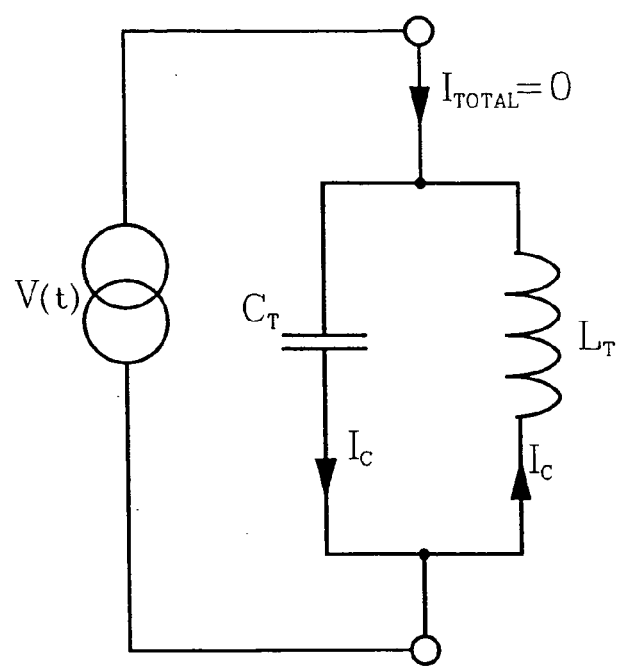
Figure 3:
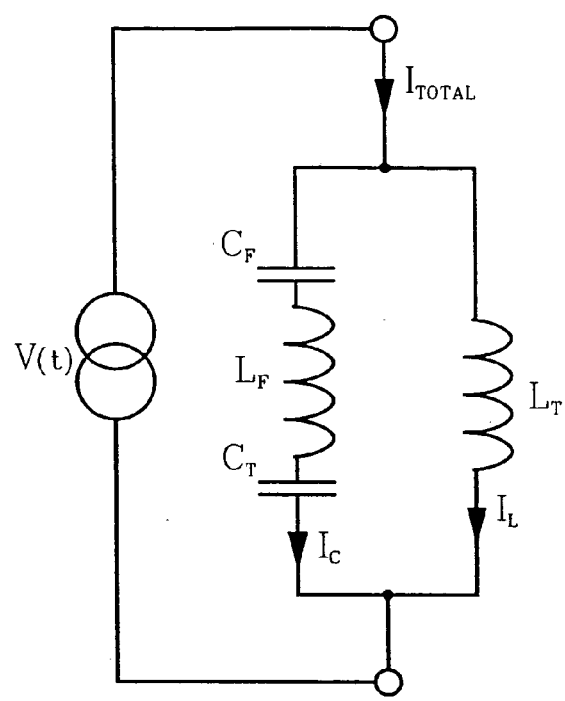
Figures 3, 4:
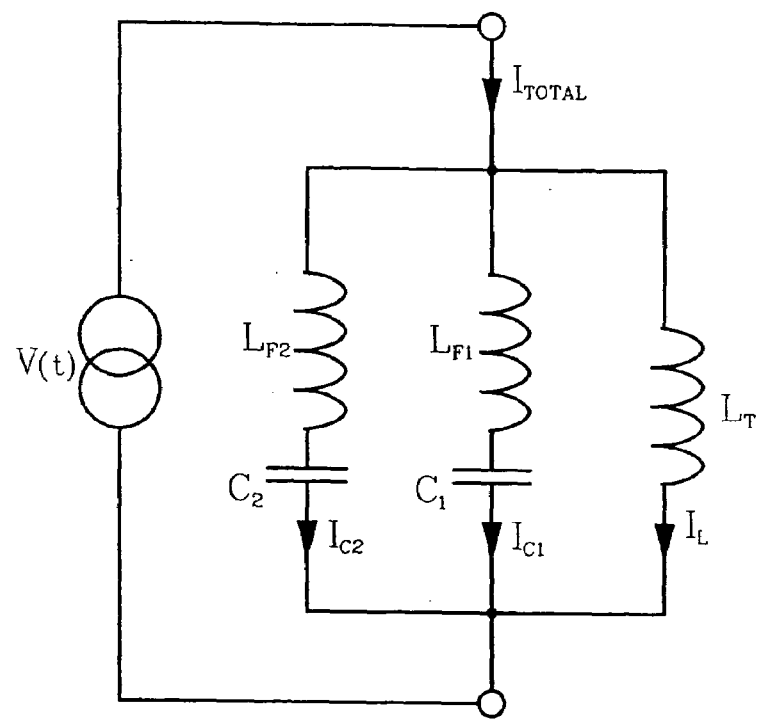
Figures 3, 4, 5:
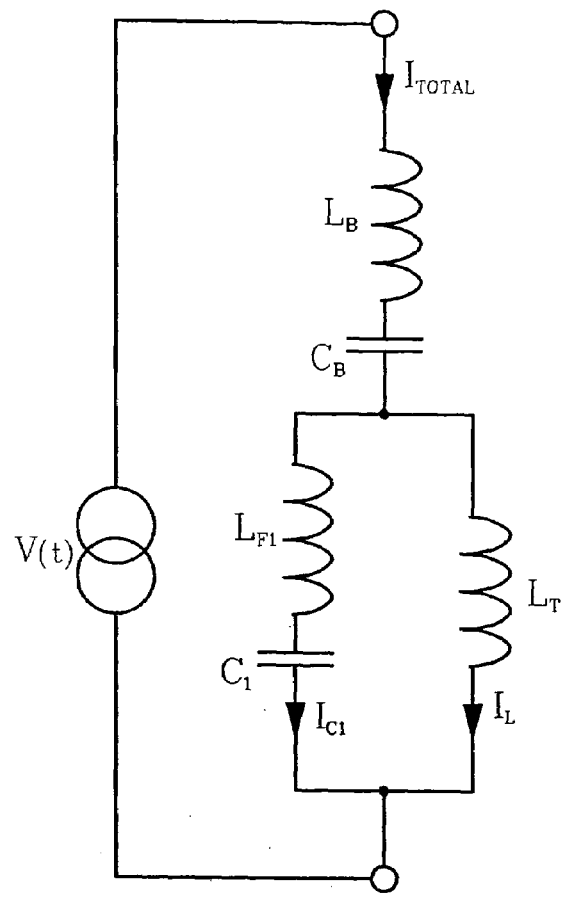
Figures 3, 4, 5, 6:
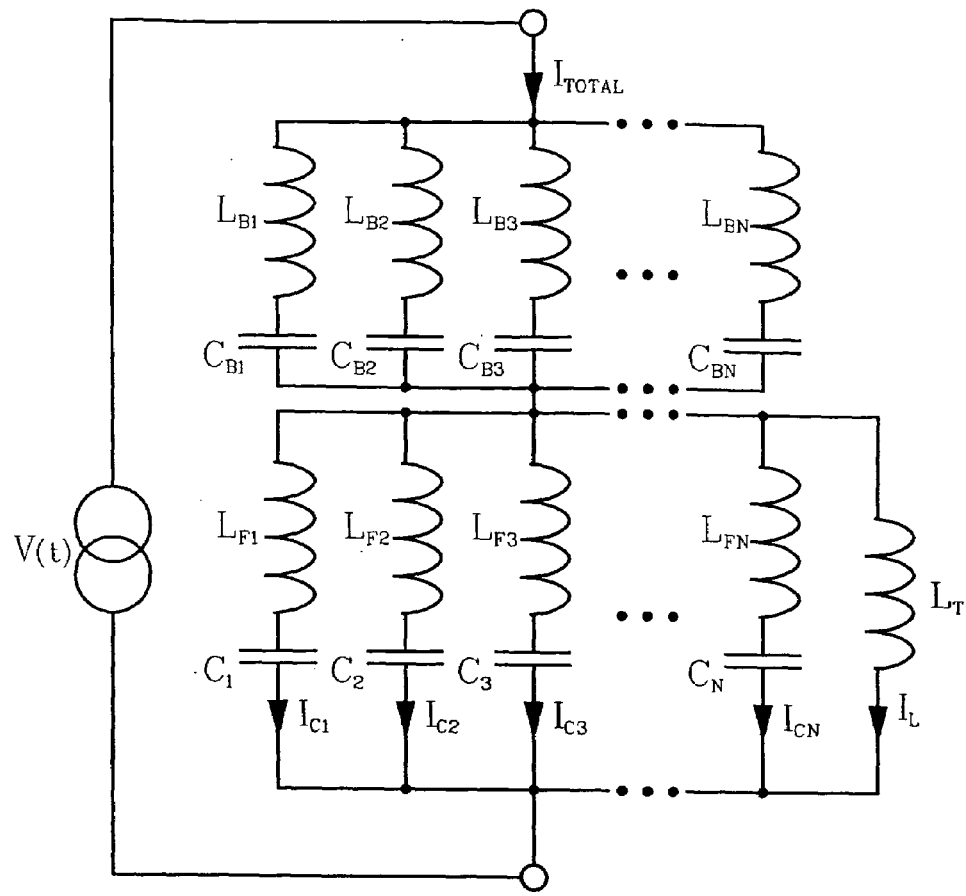
Figures 1, 4:
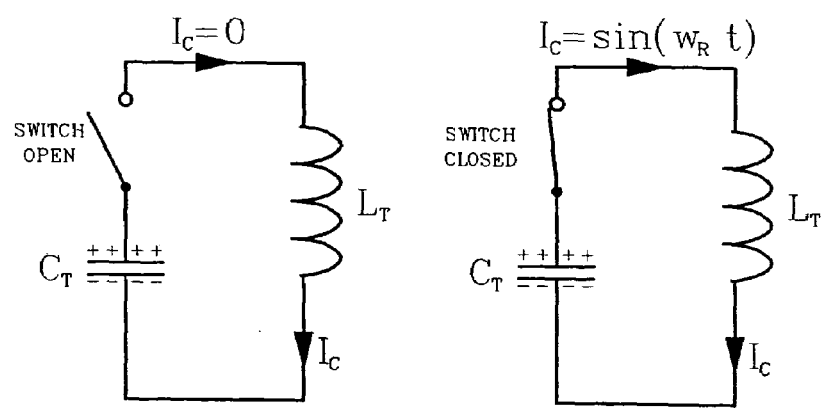
Figures 2, 4:
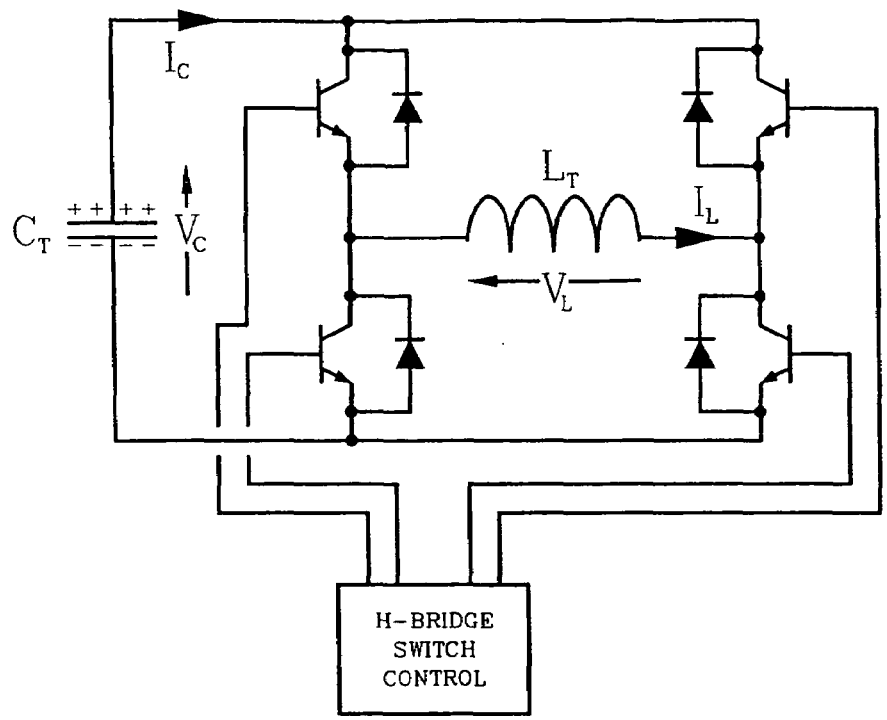
Figures 3, 4:
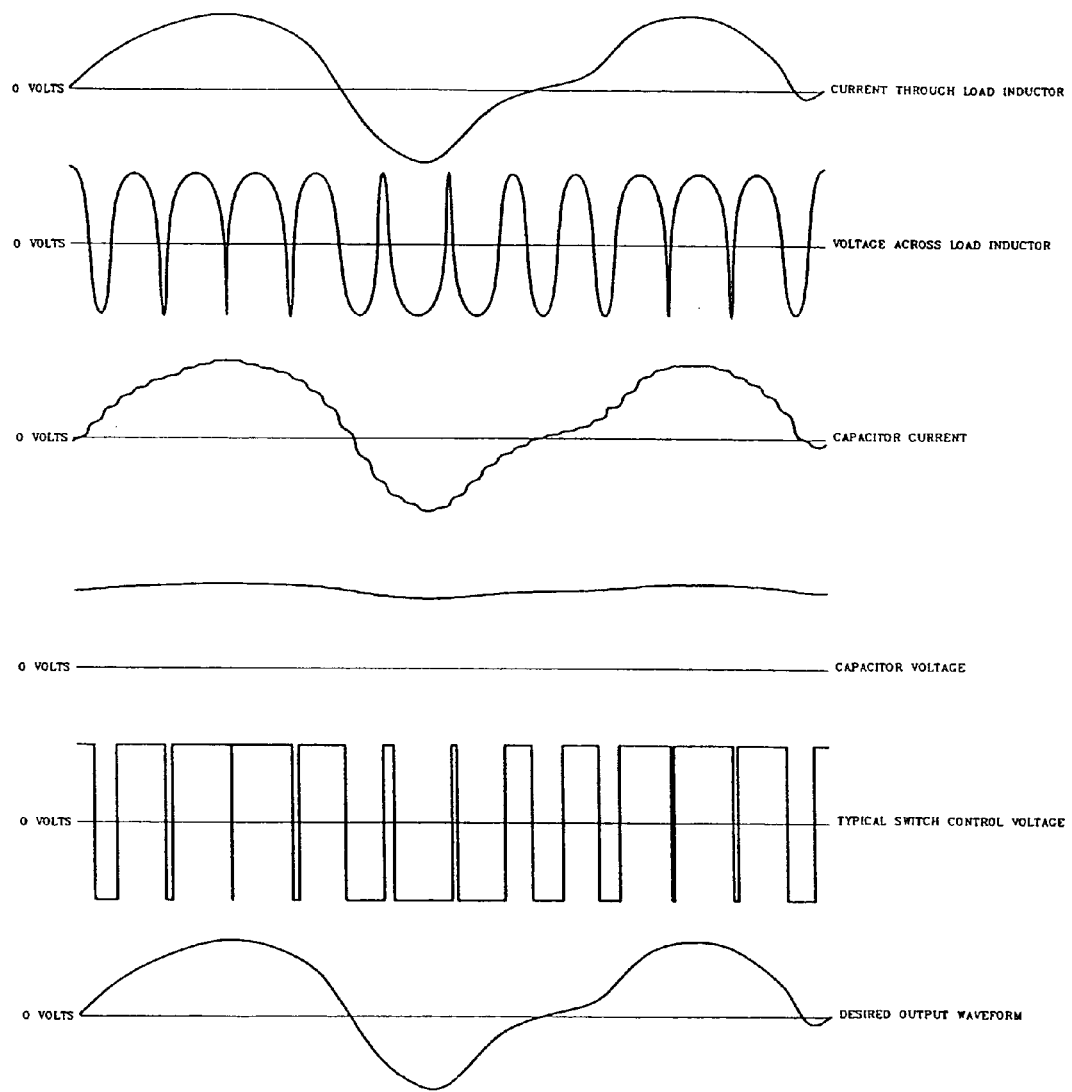
Figure 4:
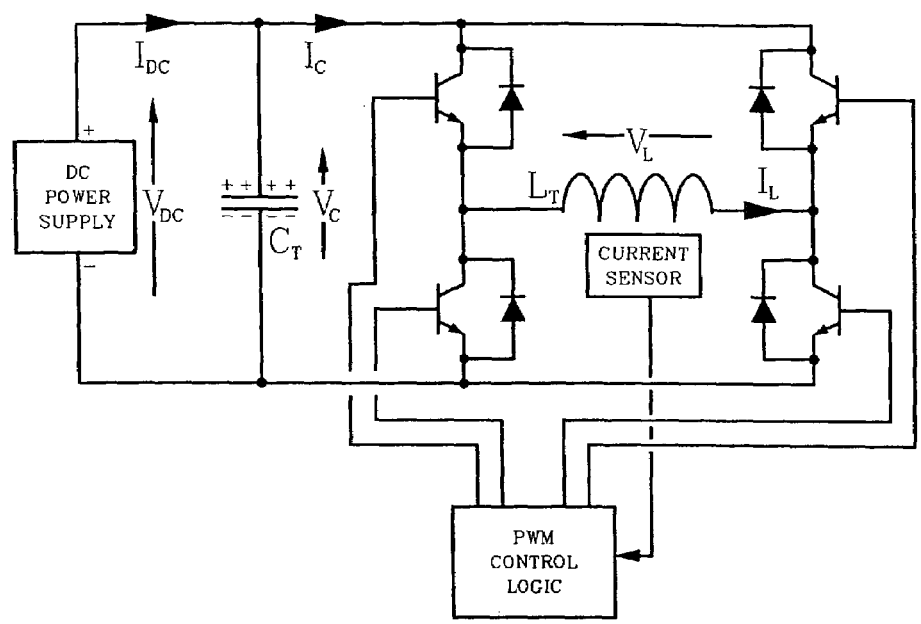
Figures 4, 5:
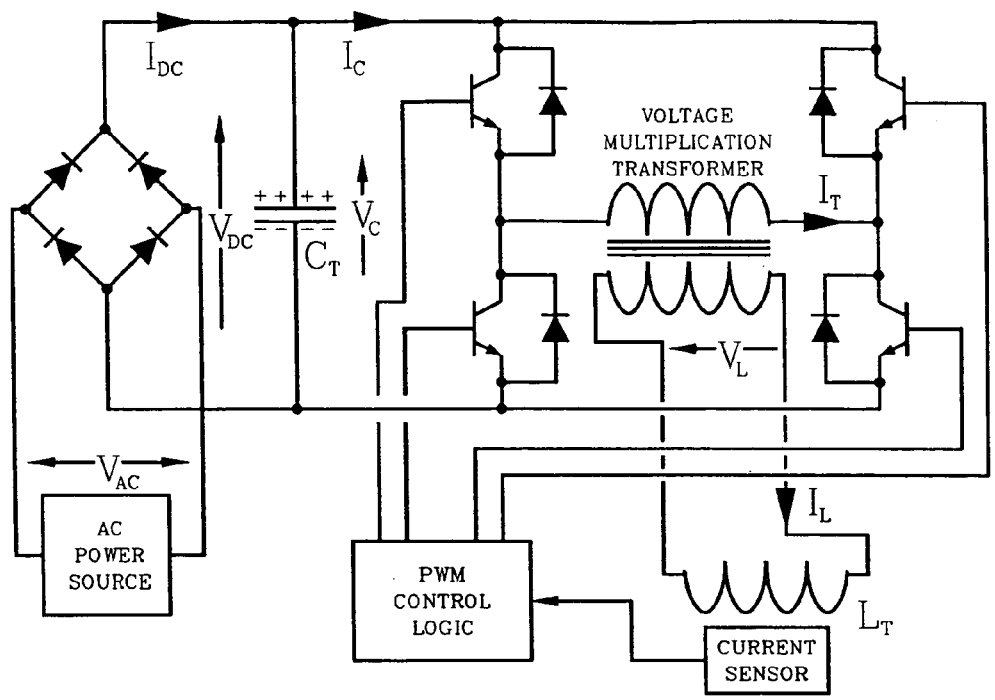
Figures 1, 5:
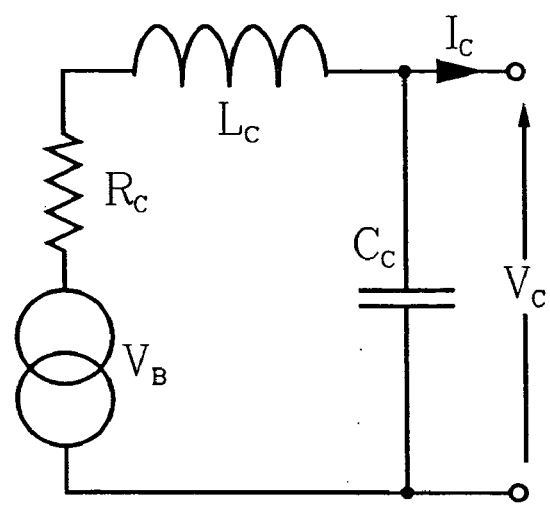
Figures 2, 5:
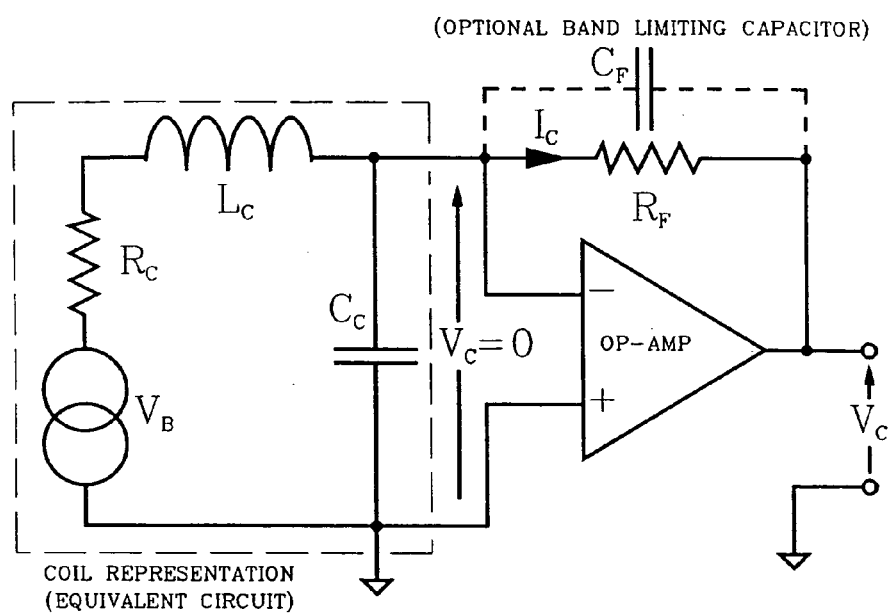
Figures 3, 5:
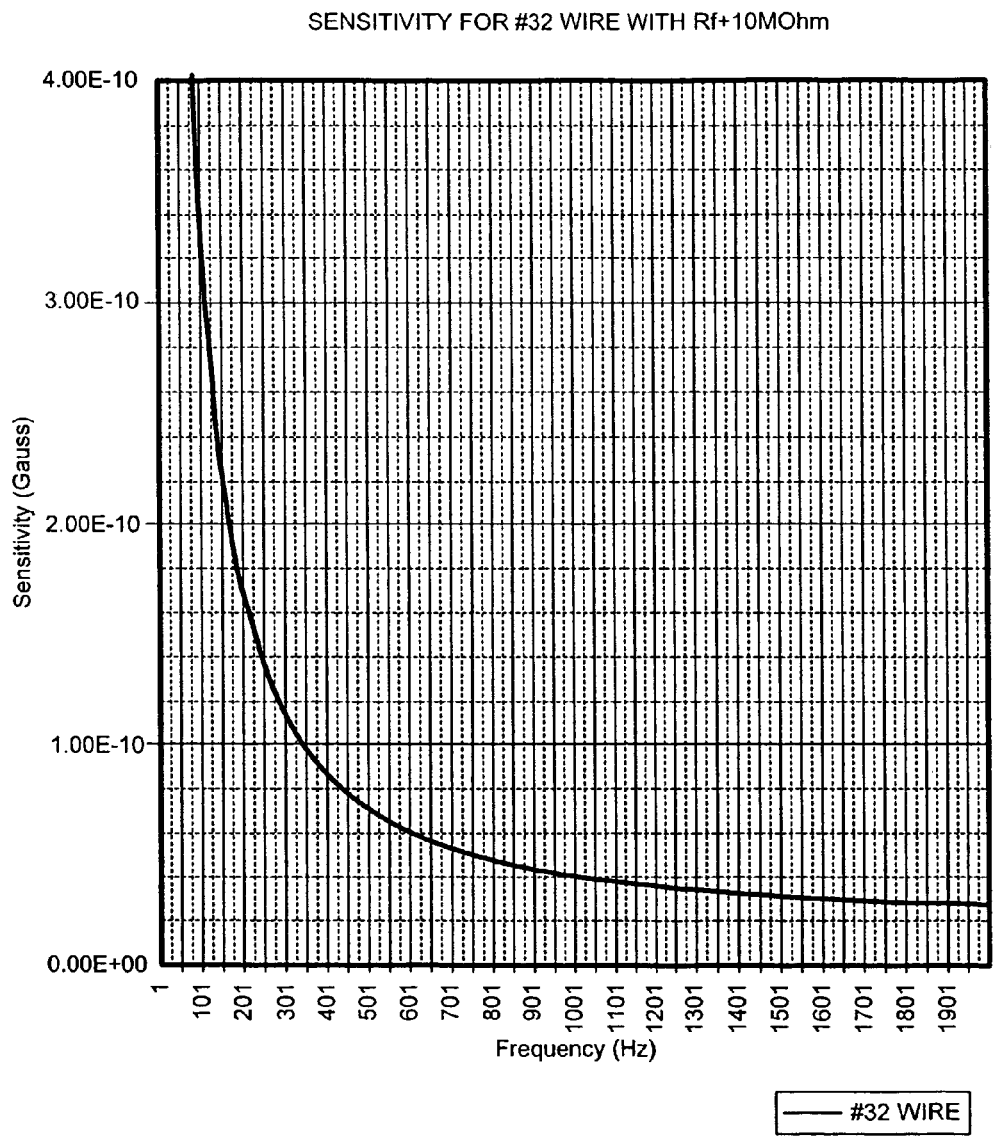
Figures 1, 6:
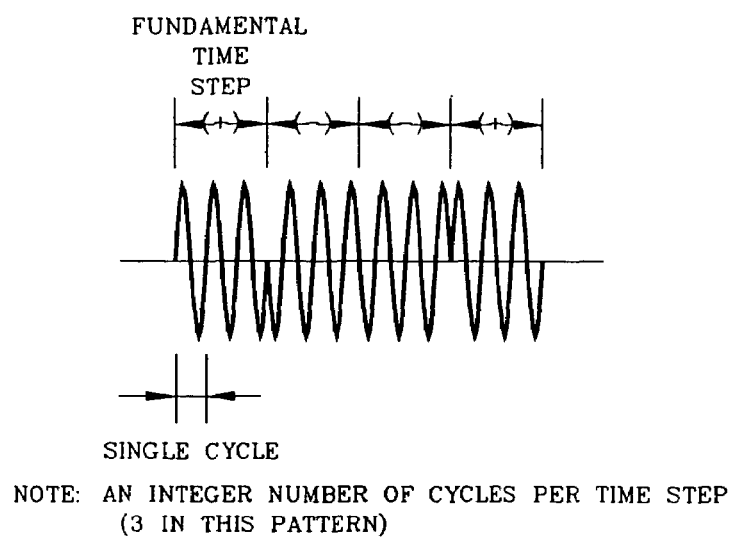
Figures 2, 6:
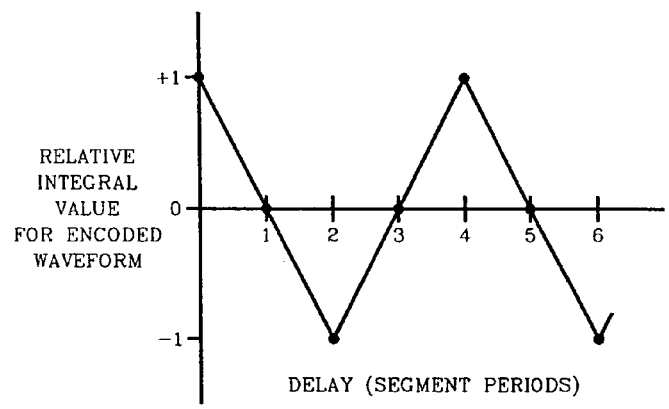
Figures 3, 6:
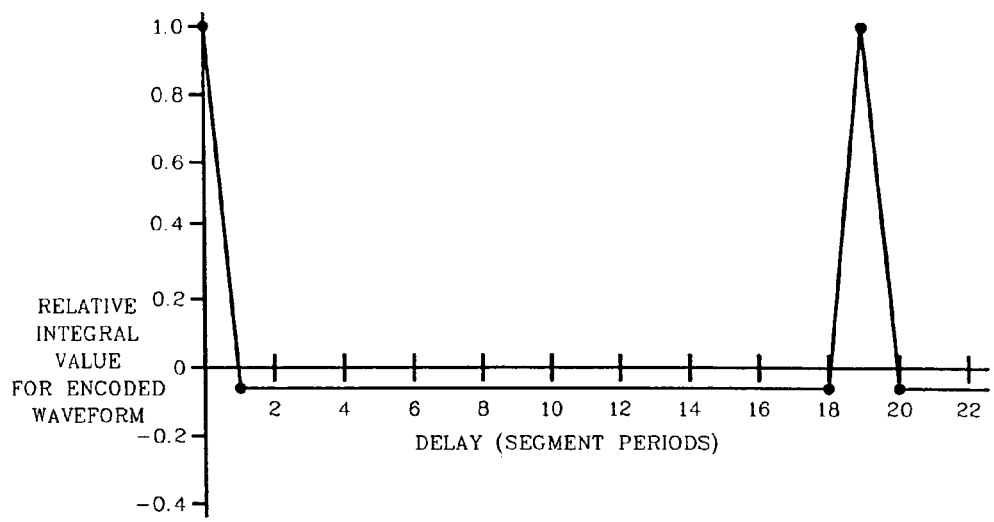
Figures 4, 6:
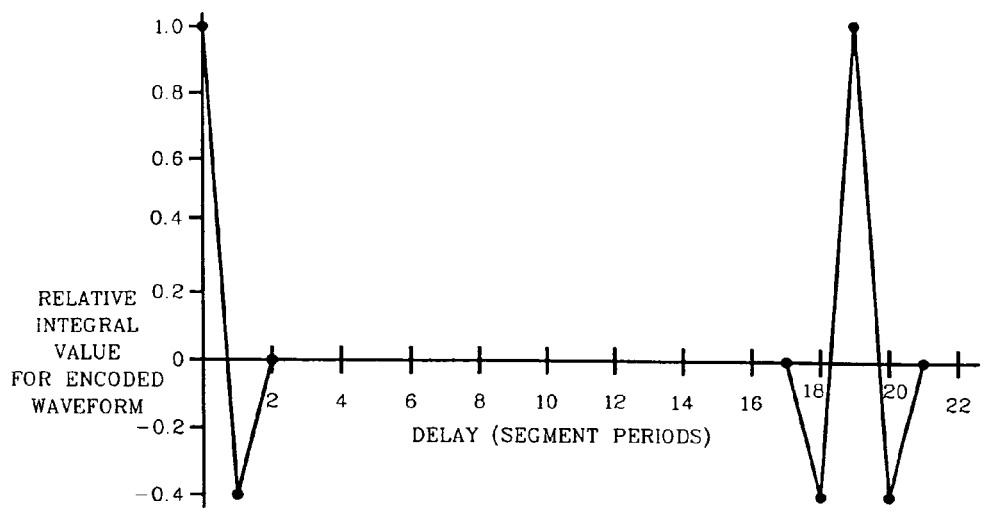
Figures 5, 6:
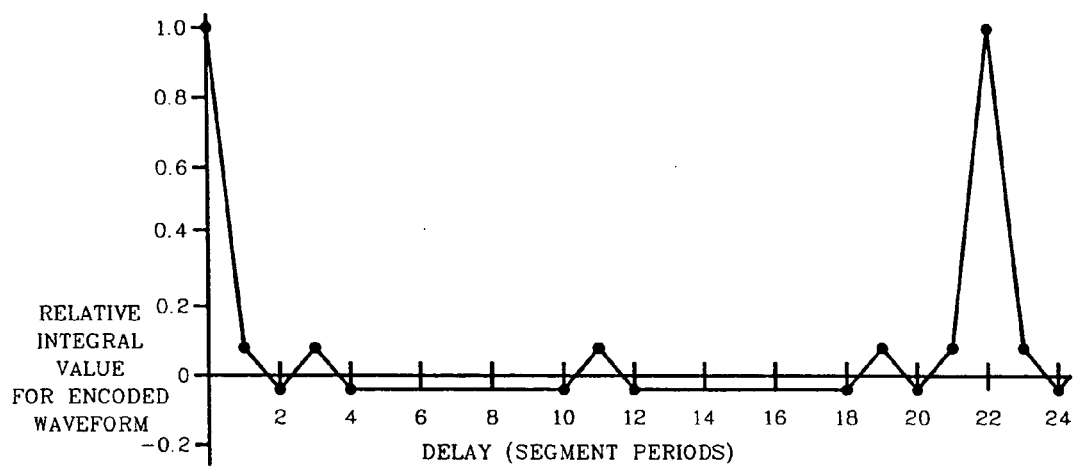
Figures 1, 7:
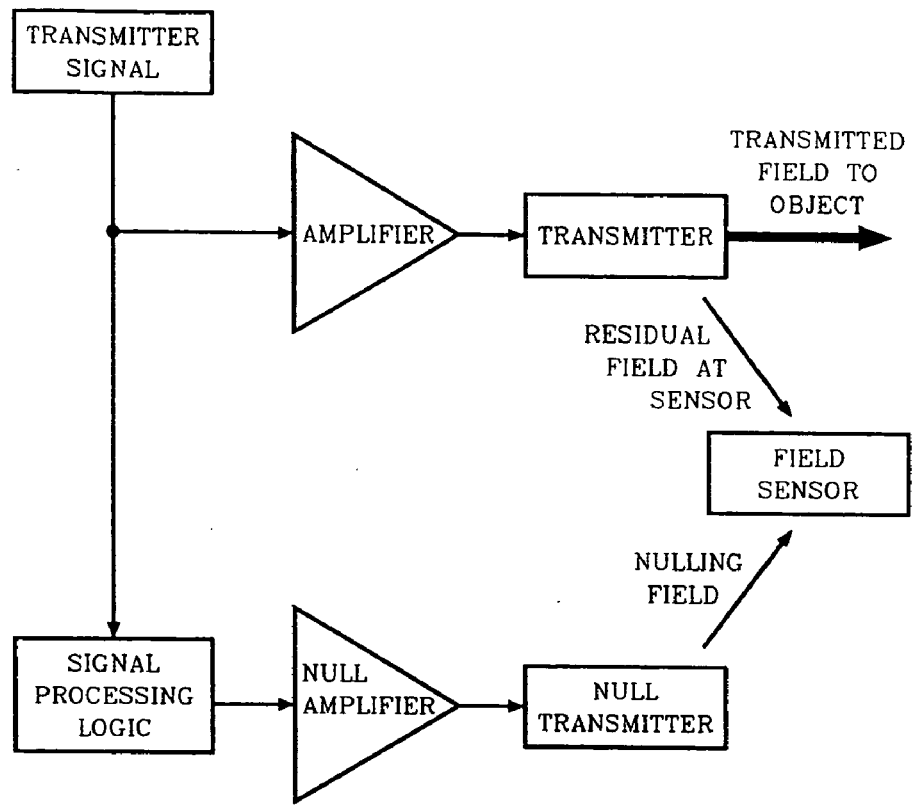

Methods according to the present invention can help resolve these issues. Such methods consist of a local magnetic field generation system for nulling the signal at the sensor. This system should be capable of being phased locked to the transmitter signal with the arbitrary phase and magnitude necessary to produce a cancellation field to zero the sensor signal. The preferred method would be to measure the sensor response with a small transmitter signal and measure and/or to calculate the cancellation signal at this level. The cancellation signal would be based on the transmitted signal level and adjusted for the magnitude of the transmitted signal. FIG. 7-1 shows one type of system that could be used. In this system the signal used to drive the transmitter amplifier is also passed to a signal processor which uses this signal to generate the signal to be passed to the nulling amplifier which in turn generates a field to zero the sensor output. In this manner the correct phase and amplitude relationships can be maintained. It is also preferable to keep the cancellation field as local as possible so as not to generate responses in the other sensors within the system.

The nulling signal need not be magnetic; it could be capacitively coupled or directly injected into the sensor as a voltage or current. In this method the effect of the background magnetic field seen by the field sensor could be eliminated and the gain increased to facilitate the detection of small signals. In the case of gradient systems, the preferred implementation would use individual nulling signals for each primary sensor to insure that they do not saturate before the gradient calculation is made.

I claim:

1. A detection system for detecting, locating and classifying an object selected from the group of magnetic and conducting objects, the detection system adapted to detect a secondary magnetic field generated by the object in response to a primary magnetic field transmitted by the detection system, the detection system including an active subsystem for generating an alternating current magnetic field of simultaneous multiple frequencies and a synchronous detection subsystem for accurately measuring the amplitude and phase of the secondary magnetic field;

in which the synchronous detection subsystem includes a plurality of sensors, and the active subsystem is adapted to shape the transmitted field in the vicinity of the sensors in order to reduce the sensors' sensitivity to the transmitted field and to desensitize the sensors to movement with respect to the active subsystem.

2. Apparatus for determining presence of an object, comprising:
   a. an emitter adapted to produce and propagate a time varying primary electromagnetic field;
   b. at least one sensor, the sensor adapted to receive a secondary electromagnetic field, the secondary electromagnetic field produced by the object as a function of the primary electromagnetic field;
   c. the sensor coupled to a receiver, the receiver adapted to determine differences in phase between the primary electromagnetic field and the secondary electromagnetic field and to provide information corresponding to identification of the material forming the object as a function of said phase differences; and
   d. in which the primary electromagnetic field contains at least one code and the at least one sensor uses the code of said primary electromagnetic field to determine said phase differences;
   e. wherein the at least one sensor is adapted to determine amplitude of the secondary electromagnetic field and to provide information corresponding to distance of the object to the at least one sensor; and
   f. wherein the at least one sensor is adapted to sense gradients in the secondary electromagnetic field.

3. Apparatus or determining presence of an object, comprising:
   a. an emitter adapted to produce and propagate a time varying primary electromagnetic field;
   b. at least one sensor, the sensor adapted to receive a secondary electromagnetic field, the secondary electromagnetic field produced by the object as a function of the primary electromagnetic field;
   c. the sensor coupled to a receiver, the receiver adapted to determine differences in phase between the primary electromagnetic field and the secondary electromagnetic field and to provide information corresponding to identification of the material forming the object as a function of said phase differences; and
   d. in which the primary electromagnetic field contains at least one code and the at least one sensor uses the code of said primary electromagnetic field to determine said phase differences;
   e. wherein the at least one sensor is adapted to determine amplitude of the secondary electromagnetic field and to provide information corresponding to distance of the object to the at least one sensor; and
   f. wherein the apparatus comprises at least two sensors, the sensors further adapted to sense amplitude and gradients in the secondary electromagnetic field, the sensors further adapted to provide information relating to direction and distance of said object from at least one of said sensors.

4. Apparatus for determining presence of an object, comprising:
   a. an emitter adapted to produce and propagate a time varying primary electromagnetic field;
   b. at least one sensor, the sensor adapted to receive a secondary electromagnetic field, the secondary electromagnetic field produced by the object as a function of the primary electromagnetic field;
   c. the sensor coupled to a receiver, the receiver adapted to determine differences in phase between the primary electromagnetic field and the secondary electromagnetic field and to provide information corresponding to identification of the material forming the object as a function of said phase differences;

d. wherein the emitter is adapted to pulse width modulate the primary electromagnetic field and e. wherein the emitter uses switched capacitors in order to pulse width modulate the primary electromagnetic field.

* * * * *